(12) United States Patent
Imai

(10) Patent No.: US 12,073,750 B2
(45) Date of Patent: Aug. 27, 2024

(54) PEDESTRIAN GUIDANCE DEVICE, PEDESTRIAN GUIDANCE METHOD, AND COMPUTER-READABLE RECORDING MEDIUM

(71) Applicant: NEC Corporation, Tokyo (JP)

(72) Inventor: Hiroshi Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/265,618

(22) PCT Filed: Dec. 8, 2020

(86) PCT No.: PCT/JP2020/045736
§ 371 (c)(1),
(2) Date: Jun. 6, 2023

(87) PCT Pub. No.: WO2022/123664
PCT Pub. Date: Jun. 16, 2022

(65) Prior Publication Data
US 2024/0038107 A1 Feb. 1, 2024

(51) Int. Cl.
*G09G 3/00* (2006.01)
*G06F 3/01* (2006.01)
(Continued)

(52) U.S. Cl.
CPC .............. *G09G 3/001* (2013.01); *G06F 3/011* (2013.01); *G06T 7/70* (2017.01); *G06V 40/10* (2022.01);
(Continued)

(58) Field of Classification Search
None
See application file for complete search history.

(56) References Cited

U.S. PATENT DOCUMENTS 9,465,984 B2 * 10/2016 Watanabe ............... G06F 3/044
2008/0048880 A1 * 2/2008 Strickland ............. G06F 3/0488
340/815.4
(Continued)

FOREIGN PATENT DOCUMENTS

JP   H01-209480 A   8/1989
JP   2002-023674 A  1/2002
(Continued)

OTHER PUBLICATIONS

International Search Report for PCT Application No. PCT/JP2020/045736, mailed on Jan. 19, 2021.
(Continued)

*Primary Examiner* — Kenneth Bukowski

(57) ABSTRACT

There is provided a pedestrian guidance device that pedestrians can be guided to their respective attributes, the pedestrian guidance device including: a detection unit configured to detect respective viewpoint positions and attributes of a plurality of pedestrians; and a display unit configured to display simultaneously a plurality of images for guiding the respective pedestrians on the same screen, based on the respective attributes of the plurality of pedestrians, and displaying the plurality of images such that the plurality of images are displayed in respective directions of the viewpoint positions of the pedestrians respectively corresponding to the images.

5 Claims, 18 Drawing Sheets

(51) Int. Cl.
*G06T 7/70* (2017.01)
*G06V 40/10* (2022.01)
*H04W 4/021* (2018.01)
*H04W 4/024* (2018.01)

(52) U.S. Cl.
CPC ........... *H04W 4/021* (2013.01); *H04W 4/024* (2018.02); *G06T 2207/30196* (2013.01); *G09G 2354/00* (2013.01)

(56) References Cited

U.S. PATENT DOCUMENTS

| | | | | |
|---|---|---|---|---|
| 2010/0153003 A1* | 6/2010 | Merkel | .................. | G01C 21/20 701/533 |
| 2016/0116829 A1* | 4/2016 | Itou | .......................... | G02B 1/11 353/30 |
| 2016/0286181 A1* | 9/2016 | Kawamura | ........... | G06F 3/0425 |
| 2022/0076598 A1* | 3/2022 | Arai | ..................... | H04N 9/3194 |

FOREIGN PATENT DOCUMENTS

| | | | |
|---|---|---|---|
| JP | 2002-054945 | A | 2/2002 |
| JP | 2007-147300 | A | 6/2007 |
| JP | 2007147300 | A * | 6/2007 |
| JP | 2016-055691 | A | 4/2016 |
| JP | 2020-003269 | A | 1/2020 |
| JP | 2020-091586 | A | 6/2020 |

OTHER PUBLICATIONS

English translation of Written opinion for PCT Application No. PCT/JP2020/045736, mailed on Jan. 19, 2021.
JP Office Action for JP Application No. 2022-567928, mailed on Apr. 23, 2024 with English Translation.

* cited by examiner

PEDESTRIAN GUIDANCE DEVICE, PEDESTRIAN GUIDANCE METHOD, AND COMPUTER-READABLE RECORDING MEDIUM

This application is a National Stage Entry of PCT/JP2020/045736 filed on Dec. 8, 2020, the contents of all of which are incorporated herein by reference, in their entirety.

TECHNICAL FIELD

The present invention relates to a pedestrian guidance apparatus, a pedestrian guidance method and a computer readable recording medium.

BACKGROUND ART

Various methods have been proposed for appropriately guiding pedestrians at complex facilities such as an airport, a station, and a commercial facility. A method for guiding a pedestrian has been proposed in which a pedestrian holds a device transmitting guidance information, such as a mobile terminal, and is guided by moving in accordance with the information. However, in this method, since the pedestrian needs to constantly watch a screen of the mobile terminal while walking, there is a problem in safety. Also, since a guidance direction may be different from a direction instructed on the screen of the mobile terminal, there is a problem in visibility or accessibility.

In view of this, a method for guiding a pedestrian with a display device installed in a facility has been developed (e.g., see Patent Document 1). In the technique disclosed in Patent Document 1, when a pedestrian holding a mobile terminal approaches a direction indicator installed on a floor surface, the direction indicator senses the approach of the mobile terminal. Then, the mobile terminal obtains a direction indicator ID through communication with the direction indicator. The mobile terminal transmits the direction indicator ID and a target area coordinate to a guidance center apparatus. The guidance center apparatus searches for a route, and obtains a direction number that represents a direction to be displayed by the direction indicator, based on the route. Thereafter, the guidance center apparatus transmits the direction number to the direction indicator via the mobile terminal. Then, the direction indicator displays the direction. According to the Patent Document 1, since the direction indicator is installed on a floor surface, for example, a pedestrian can observe the direction indicator without disturbing their walking posture, that is to say in a natural posture, and move smoothly.

LIST OF RELATED ART DOCUMENTS

Patent Document

Patent Document 1: JP2002-54945A

SUMMARY OF INVENTION

Problems to be Solved by the Invention

However, when a plurality of pedestrians look at information displayed on the same display device in the same area, in the technique disclosed in Patent Document 1, information for individual pedestrians cannot be presented, and thus it is difficult to guide the pedestrians individually.

An example object of the present invention is to provide a pedestrian guidance device and a pedestrian guidance method for guiding pedestrians appropriately in a natural posture by displaying images respectively corresponding to viewpoint positions and attributes of the pedestrians, and a computer-readable recording medium with a program recorded thereon for realizing the apparatus and method.

Means for Solving the Problems

In order to achieve the above object, a pedestrian guidance device in one aspect of the present invention includes:
  a detection unit configured to detect respective viewpoint positions and attributes of a plurality of pedestrians; and
  a display unit configured to display simultaneously a plurality of images for guiding the respective pedestrians on the same screen, based on the respective attributes of the plurality of pedestrians, and displaying the plurality of images such that the plurality of images are displayed in respective directions of the viewpoint positions of the pedestrians respectively corresponding to the images.

Also, in order to achieve the above object, a pedestrian guidance method in one aspect of the present invention includes:
  detecting respective viewpoint positions and attributes of a plurality of pedestrians; and
  displaying simultaneously a plurality of images for guiding the respective pedestrians on the same screen, based on the respective attributes of the pedestrians, and displaying the plurality of images such that the plurality of images are presented in respective directions of the viewpoint positions of the pedestrians respectively corresponding to the images.

Furthermore, in order to achieve the above object, a computer-readable recording medium that includes a program recorded thereon, the program including instructions that cause a computer to carry out:
  detecting respective viewpoint positions and attributes of a plurality of pedestrians; and
  displaying simultaneously a plurality of images for guiding the respective pedestrians on the same screen, based on the respective attributes of the pedestrians, such that the plurality of images are presented in respective directions of the viewpoint positions of the pedestrians respectively corresponding to the images.

Advantageous Effects of the Invention

As described above, according to the present invention, it can be guiding pedestrians appropriately in a natural posture by displaying images respectively corresponding to viewpoint positions and attributes of the pedestrians.

BRIEF DESCRIPTION OF THE DRAWINGS

FIG. 8 is a diagram illustrating examples of usage for the purpose of ensuring social distancing to alleviate congestion, prevent the spread of disease, and the like.

FIG. 9 is a diagram illustrating examples of usage for the purpose of ensuring social distancing to alleviate congestion, prevent the spread of disease, and the like.

EXAMPLE EMBODIMENT

First Example Embodiment

First, a pedestrian guidance device according to a first example embodiment will be described with reference to the drawings.

[Apparatus Configuration]

Figure 1:
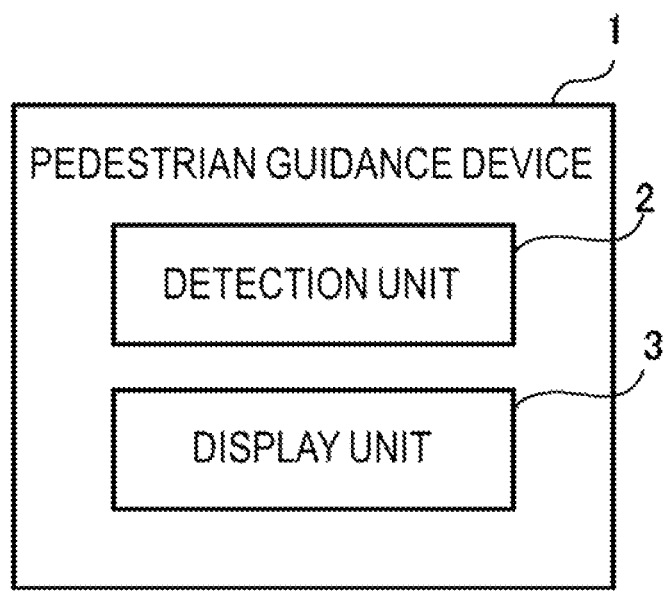
FIG. 1 is a configuration diagram illustrating an overall configuration of the pedestrian guidance device according to the first example embodiment.

First, an overall configuration of the pedestrian guidance device according to the first example embodiment will be described with reference to FIG. 1. FIG. 1 is a configuration diagram illustrating an overall configuration of the pedestrian guidance device according to the first example embodiment.

A pedestrian guidance device 1 is a device for guiding a plurality of pedestrians by presenting information for guiding the respective pedestrians, to the pedestrians. As shown in FIG. 1, the pedestrian guidance device 1 includes a detection unit 2 and a display unit 3.

The detection unit 2 detects the respective viewpoint positions and attributes of the plurality of pedestrians. The method for the detection will be described later.

The display unit 3 displays a plurality of images for guiding the plurality of pedestrians simultaneously on the same screen, based on the respective attributes of the plurality of pedestrians. Also, the display unit 3 displays a plurality of images such that the plurality of images are presented in the directions of viewpoint positions of the pedestrians respectively corresponding to the displayed images.

According to the pedestrian guidance device 1, the images for guiding the pedestrians, which are based on their attributes, can be displayed on the same display screen with respect to the respective viewpoint directions of the pedestrians. Each of the pedestrians can find out information such as a route to a destination by looking at the image displayed in accordance with the line of sight of the pedestrian. That is, the pedestrian guidance device 1 can guide the plurality of pedestrians without disturbing their walking posture, that is to say, in a natural posture, by displaying images respectively corresponding to the viewpoint positions and the attributes of the pedestrians.

Next, the configuration and function of the pedestrian guidance device 1 according to the first example embodiment will be described in detail.

Figure 2:
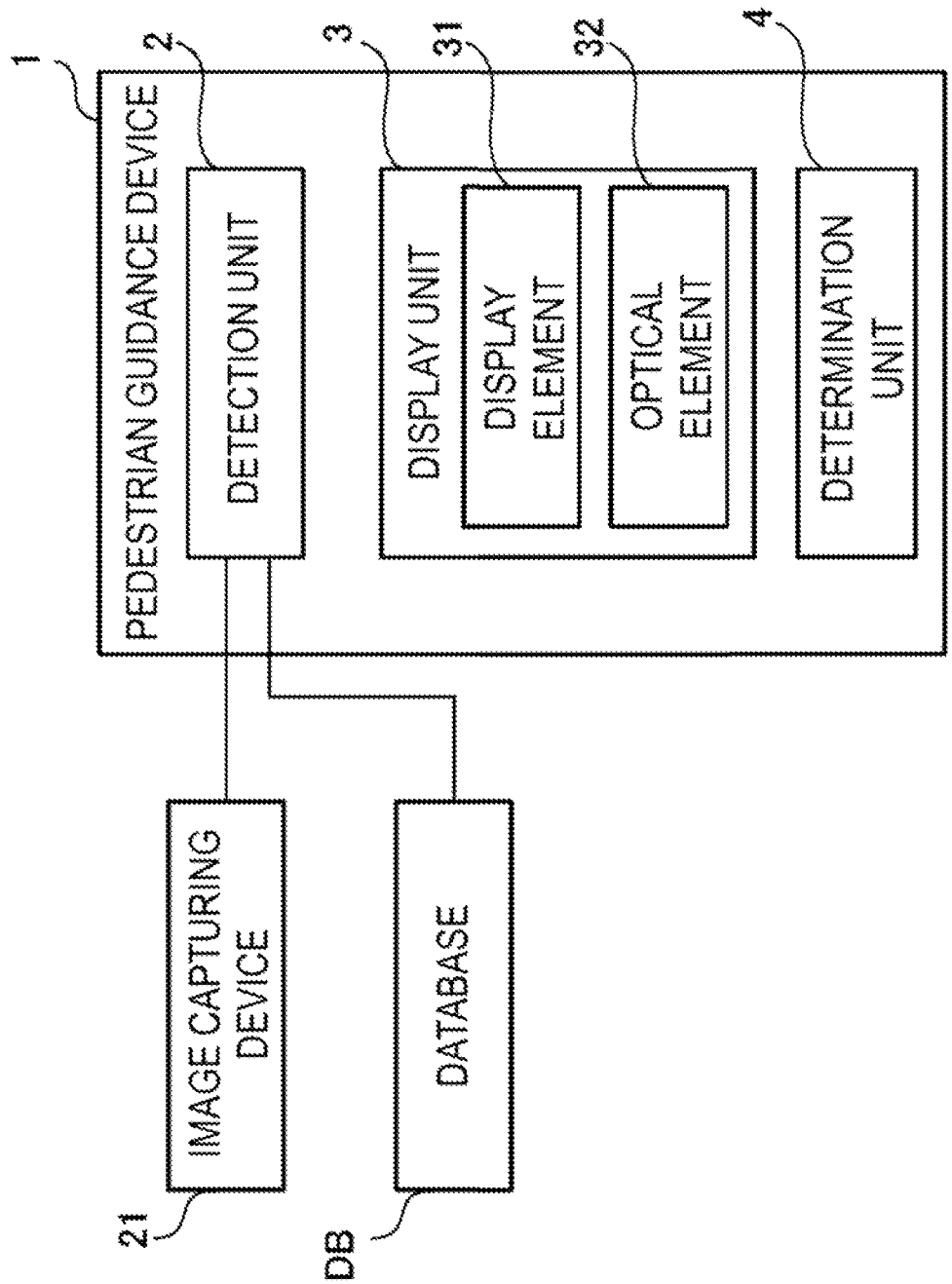
FIG. 2 is a configuration diagram for illustrating a specific configuration of the pedestrian guidance device.
Figure 3:
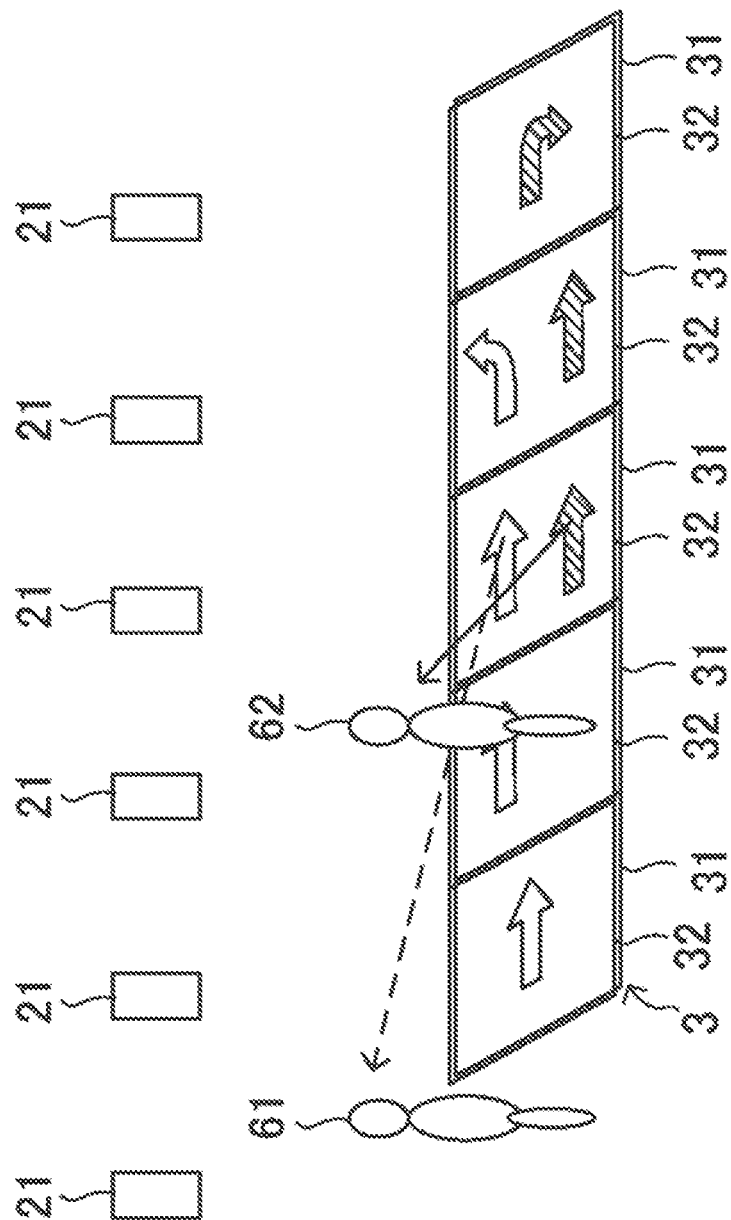
FIG. 3 is a diagram for illustrating a mode of guiding pedestrians performed by the pedestrian guidance device.

FIG. 2 is a configuration diagram for illustrating a specific configuration of the pedestrian guidance device 1. FIG. 3 is a diagram for illustrating a mode of guiding pedestrians performed by the pedestrian guidance device 1.

As described above, the pedestrian guidance device 1 includes the detection unit 2, the display unit 3, and a determination unit 4.

The detection unit 2 detects the respective viewpoint positions of the plurality of pedestrians. As shown in FIG. 3, a plurality of image capturing devices 21 serving as optical sensors for detecting the pedestrians on a path are installed on the path. The image capturing devices 21 are, for example, cameras having semiconductor sensors (CMOS, CCD, etc.) as light-receiving elements. The image capturing devices 21 capture images of face and walking appearance of pedestrians 61 and 62 walking along the path. Upon obtaining the captured images from the image capturing devices 21, the detection unit 2 measures the gaits, positions, and face positions of the pedestrians through known computational image processing, and calculates the viewpoint positions of the pedestrians. Note that the detection of the viewpoint positions is performed through known computational image processing used in detecting eyes, iris positions, and pupil positions in the face images in the captured images. Here, the known computational image processing used in detecting the gaits, positions, face positions, eyes, iris positions, and pupil positions in the face images of the pedestrians refers to feature detection processing such as that performed using a Haar-like feature analyzer, or other various types of image processing having similar functions. The detection unit 2 calculates the directions (described later) from the display units 3 installed on the floor to the viewpoint positions. Note that the image capturing devices 21 may be installed for the pedestrian guidance device 1, or for other usages such as security measures.

The detection unit 2 detects the respective attributes of the plurality of pedestrians. The attribute is information including name, gender, service identification number, destination, and information for prompting (motivating) the pedestrian to take an action (convenience provision, purchase inducement), and the like. Upon obtaining the captured images from the image capturing devices 21, the detection unit 2 for detecting the pedestrians performs individual authentication by comparing the captured face images of the pedestrians to face images that are pre-registered in a database DB. Then, the detection unit 2 detects the attributes that are pre-registered in the database DB in association with the individuals.

The determination unit 4 determines a route to the destination of each pedestrian, based on the attribute detected by the detection unit 2. For example, when the detection unit 2 detects the destination as the attribute, the determination unit 4 determines a route to the destination. Also, when the detection unit 2 detects the name or identification number as the attribute, the determination unit 4 obtains a destination that is pre-registered in the database DB and corresponds to the name or identification number. Then, the determination unit 4 determines the route to the obtained destination. Further, when the detection unit 2 detects action prompting information as the attribute, the determination unit 4 determines the destination based on the action prompting information and the route to the destination. The attribute "gender" is used as information for guidance to a restroom for the corresponding gender, prompting purchase of products for that gender, or guidance to an area where such products are sold, for example.

Based on the detected attributes, the display unit 3 displays images for guiding the pedestrians, toward the detected viewpoint positions. The images for guiding the pedestrians are, for example, arrows or textual information indicating a traveling direction of the pedestrian. Specifically, as shown in FIG. 3, the display unit 3 displays the images of arrows indicating traveling directions, based on the routes to the destinations determined by the determination unit 4.

Figure 4:
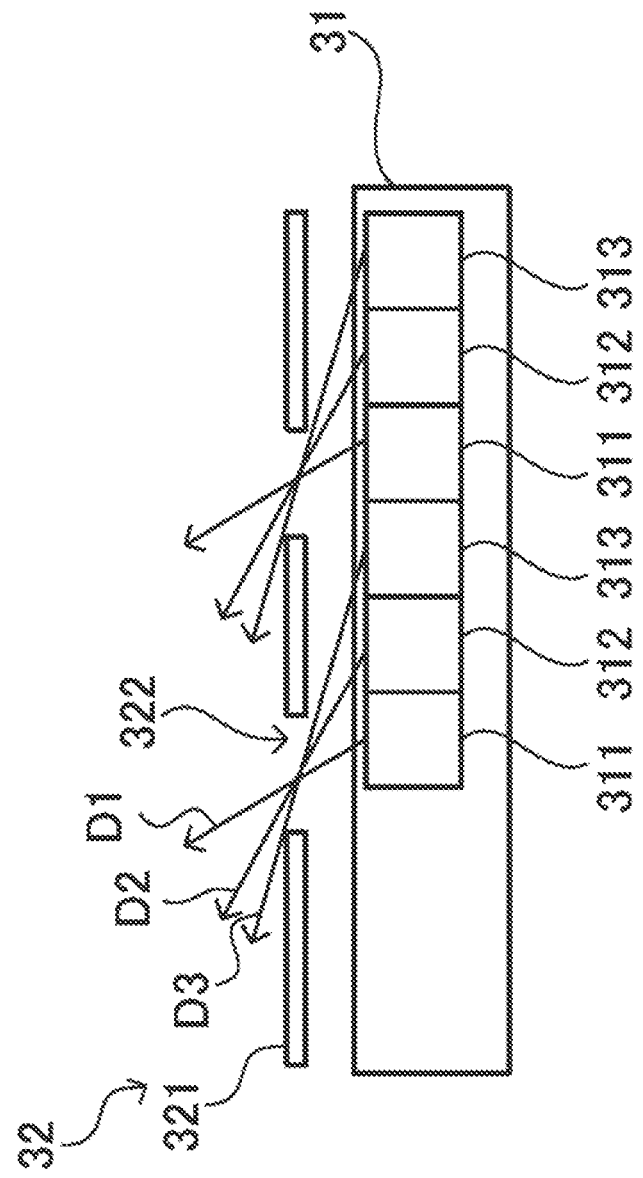
FIG. 4 is a diagram for illustrating the configuration of the display unit.

Here, the configuration of the display unit 3 will be described. FIG. 4 is a diagram for illustrating the configuration of the display unit 3. The display unit 3 includes a display element 31 such as a liquid crystal display element. The display unit 3 displays a plurality of images on a display screen of the display element 31 thereof. As shown in FIG. 3, the display units 3 are installed such that the display screens thereof extend along a floor surface of the path on which the plurality of pedestrians pass. Although five display units 3 are provided in FIG. 3, the number of the display units 3 is not particularly limited, and may be one. Although the display units 3 are arranged side by side with no interval therebetween, they may be arranged side by side with an interval therebetween. Also, the size of the display unit 3 is not particularly limited. Further, the display element 31 may be a light-emitting element such as an organic EL element, an LED array, or a laser array.

The display unit 3 includes an optical element 32 provided along the display screen thereof. The optical element 32 controls propagation of light emitted from the display screen of the display unit 3 to present a plurality of images displayed on the display screen in the different directions. In the example embodiment, the optical element 32 is a parallax barrier. Note that the optical element 32 may be lenticular lenses. Also, although not illustrated, transparent acryl plates with a thickness that can support the weight of the pedestrians are disposed along the optical elements 32.

The parallax barrier has a planar base body. In the base body, light shielding regions 321 having a light shielding property and slit regions 322 having a light transmitting property are formed alternatingly with a predetermined interval therebetween. The parallax barrier is configured such that specific pixels emit light in specific directions via the slit regions 322. In FIG. 4, the slit regions 322 are formed such that three pixels 311, 312, and 313 emit light in three directions. Specifically, the slit regions 322 are formed such that the pixel 311 emits light in a direction D1, the pixel 312 emits light in a direction D2, and the pixel 313 emits light in a direction D3. In this manner, by causing the pixels corresponding to the directions of the viewpoint positions of the pedestrians emit light, the pedestrians can observe the pixels emitting light.

For example, in FIG. 3, when the direction from the four display units 3 located on the left side to the viewpoint position of the pedestrian 61 is detected, the pixels of the display units 3 corresponding to the directions emit light and display the images (white arrows in the figure) for guiding the pedestrian 61 to the destination. On the other hand, when the direction from the three display units 3 located on the right side to the viewpoint position of the pedestrian 62 is detected, the pixels of the display units 3 corresponding to the direction emit light to display the images (hatched arrows in the drawing) for guiding the pedestrian 62 to the destination. The images of the white arrows can be viewed only from the viewpoint position of the pedestrian 61. The images of the hatched arrows can be viewed only from the viewpoint position of the pedestrian 62. In other words, since the pedestrian 61 can view only the images of the white arrows, the pedestrian 61 can arrive at the destination by following the white arrows. Similarly, since the pedestrian 62 can view only the images of the hatched arrows, the pedestrian 62 can arrive at the destination by following the hatched arrows. Also, due to the images displayed in the respective directions of the viewpoint positions of the pedestrians, the pedestrians can view the images without disturbing their walking posture, that is to say, in a natural posture.

Note that in FIG. 4, light is emitted from the display element 31 in the three directions, but there is no limitation thereto. For example, if the display element 31 of the display unit 3 is a liquid display element having a size of 1 m×0.56 m (4096×2160 pixels), is disposed such that the longitudinal direction (the direction of 4096 pixels (1 m)) is the traveling direction of the pedestrian, and the number of slits of the parallax barrier is 512, light is emitted in eight directions from the display element 31.

[Apparatus Operation]

Figure 5:
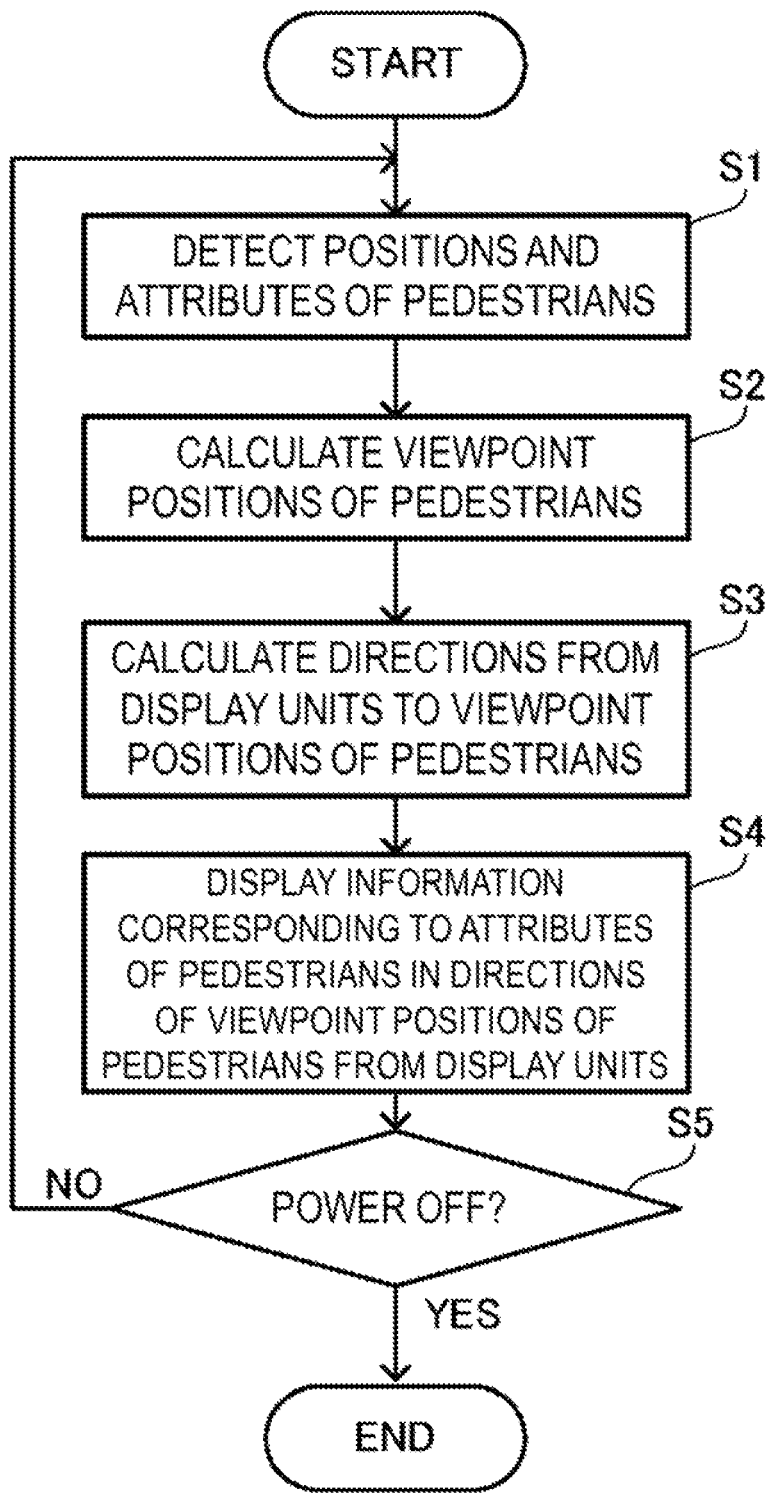
FIG. 5 is a flowchart illustrating the operation of the pedestrian guidance device according to the first example embodiment.

Next, the operation of the pedestrian guidance device according to the first example embodiment will be described using FIG. 5. FIG. 5 is a flowchart illustrating the operation of the pedestrian guidance device 1 according to the first example embodiment. In the following description, FIG. 1 to FIG. 4 are referenced as appropriate. Also, in the first example embodiment, the pedestrian guidance method is implemented by operating the pedestrian guidance device. Accordingly, the description of the pedestrian guidance method according to the example embodiment is replaced with the following description of the operation of the pedestrian guidance device 1.

First, the detection unit 2 detects the positions of the pedestrians from the results of capturing images using the image capturing devices 21. Also, the detection unit 2 detects the respective attributes (destinations, etc.) of the pedestrians from the result of image capturing by referencing the database DB (S1). Next, the detection unit 2 calculates the viewpoint positions of the pedestrians from the detected positions of pedestrians (S2). Then, the detection unit 2 calculates the directions of the viewpoint positions of the respective pedestrians from the display units 3 installed on the floor surface of the path (S3).

The display units 3 cause the pixels corresponding to the directions calculated in S3 emit light to display the information to be displayed (information that is derived from the attributes and prompts the pedestrians to take an action) based on the attributes detected in S1 (S4). When the power supply of the pedestrian guidance device 1 is turned off (S5: YES), the pedestrian guidance device 1 ends this processing, and when the power supply is not turned off (S5: NO), the pedestrian guidance device 1 repeats the processing from S1. Note that the operation of S1 may be repeated until the pedestrians are detected in S1, S1 to S4 may be executed every certain amount of time, or S1 to S4 may be executed at random timings.

According to the first example embodiment as described above, by presenting the information respectively corresponding to the sight line viewpoint positions and attributes of the plurality of pedestrians to the plurality of pedestrians present in the same area on each of the display units 3, it is possible to appropriately guide the plurality of pedestrians to their respective destinations without disturbing their walking posture, that is to say, in a natural posture.

[Usage Example]

Figure 6:
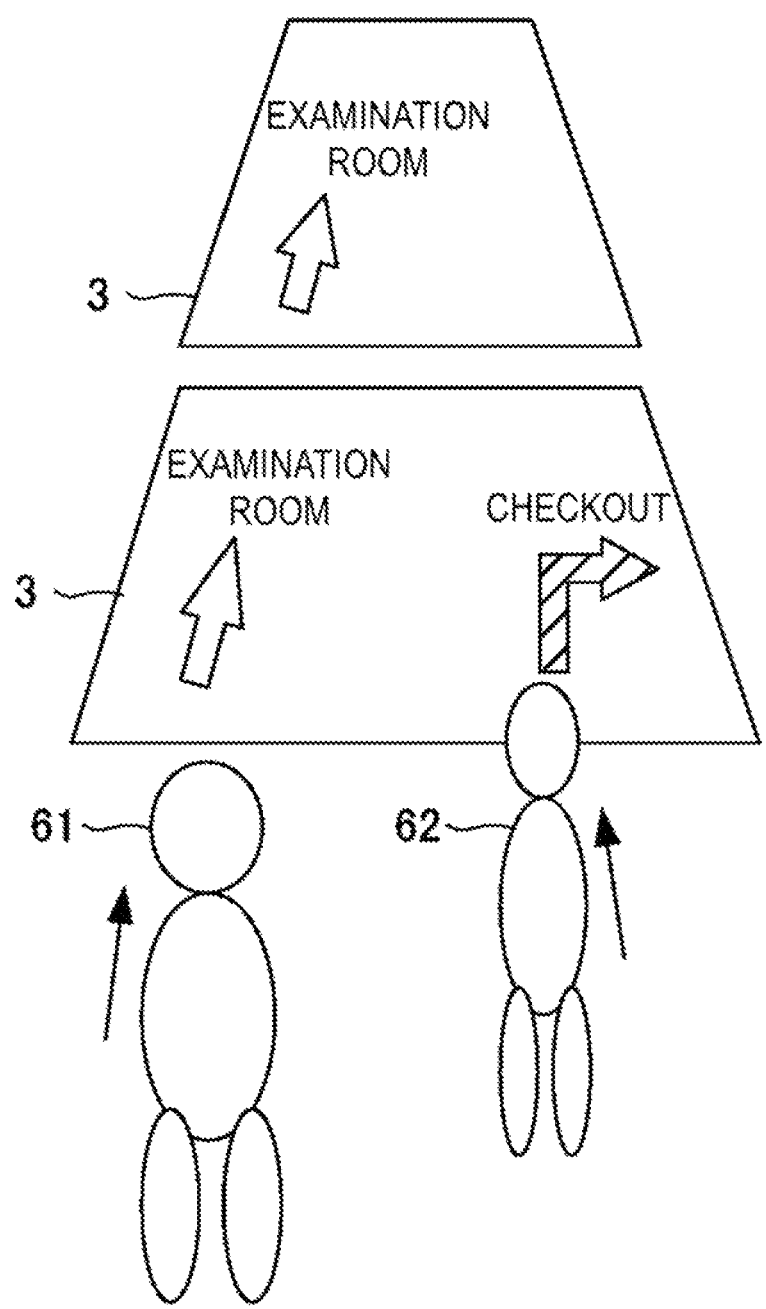
FIG. 6 is a diagram for illustrating an example of usage of the pedestrian guidance device in a facility.
Figure 7:
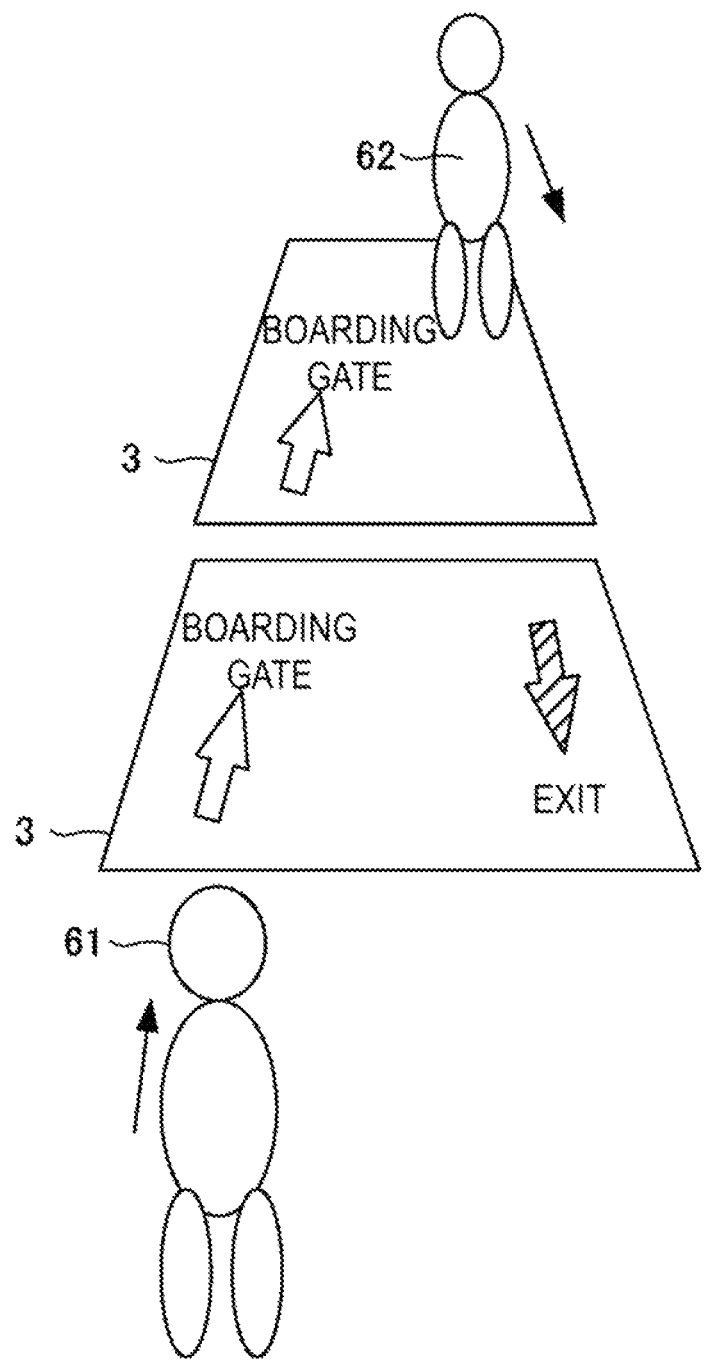
FIG. 7 is a diagram for illustrating an example of usage of the pedestrian guidance device in a facility.

FIGS. 6 and 7 are diagrams for illustrating an example of usage of the pedestrian guidance device 1 in a facility.

FIG. 6 shows an example of usage in a medical facility such as a hospital. Both of the pedestrians 61 and 62 travel toward the back side relative to the paper surface, and the pedestrian 61 heads to an examination room. Signs including the words "examination room" and an arrow (a white arrow in the figure) are displayed to the pedestrian 61 to guide the pedestrian 61 to the examination room. The pedestrian 62 heads to checkout, and is guided to checkout by signs including the word "checkout" and an arrow (a hatched arrow in the figure) being displayed to the pedestrian 62.

FIG. 7 is an example of usage in a transportation facility such as an airport. The pedestrian 61 travels toward the back side relative to the paper surface, and the pedestrian 62 travels front side relative to the paper surface, and the pedestrian 61 heads to a boarding gate, and is guided to the boarding gate by signs including the words "boarding gate" and an arrow (a white arrow in the figure) being displayed to the pedestrian 61. The pedestrian 62 heads to an exit, and is guided to the exit by the signs each including the word "exit" and an arrow (a hatched arrow in the figure) being displayed to the pedestrian 62. Note that these signs may also indicate, for example, "Stop position ahead" and "Stop here", in accordance with a stop position at a safety inspection site, an immigration inspection site, or a customs inspection site, or the positions of the pedestrians 61 and 62, and information such as "resident" or "foreigner", in accordance with the nationalities (attributes) of the pedestrians 61 and 62.

Figure 8:
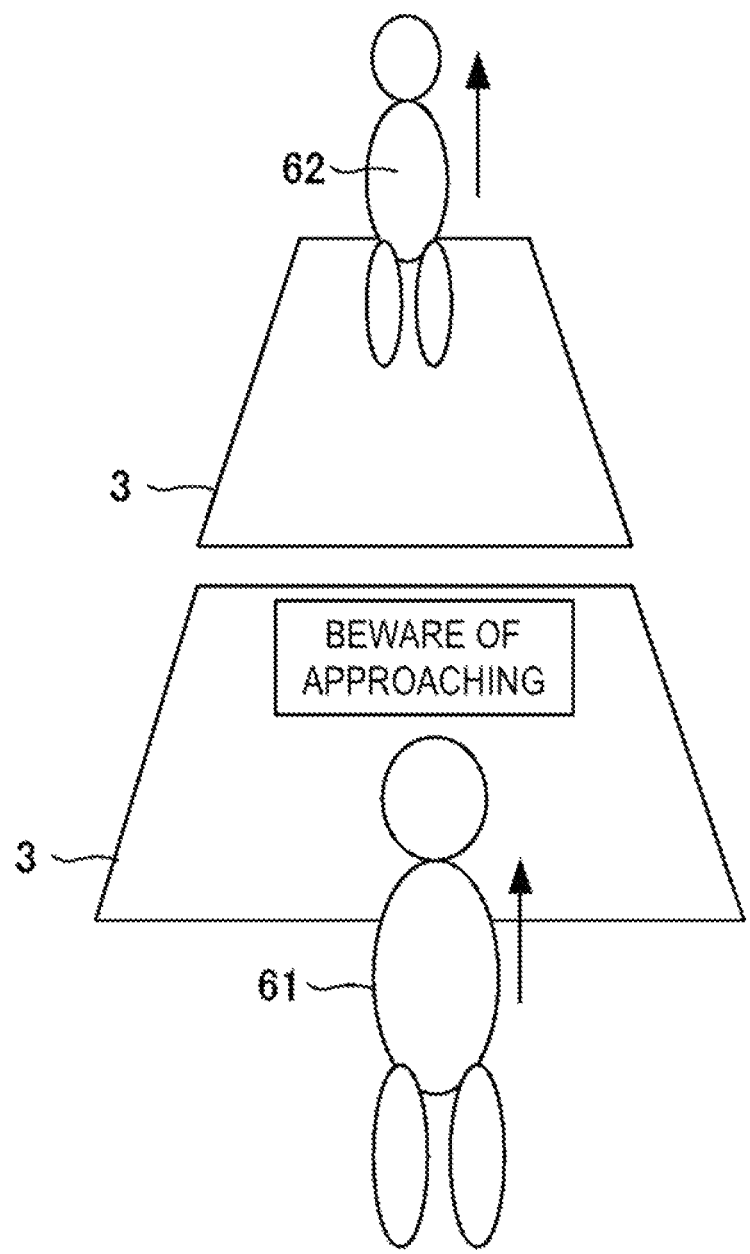
Figure 9:
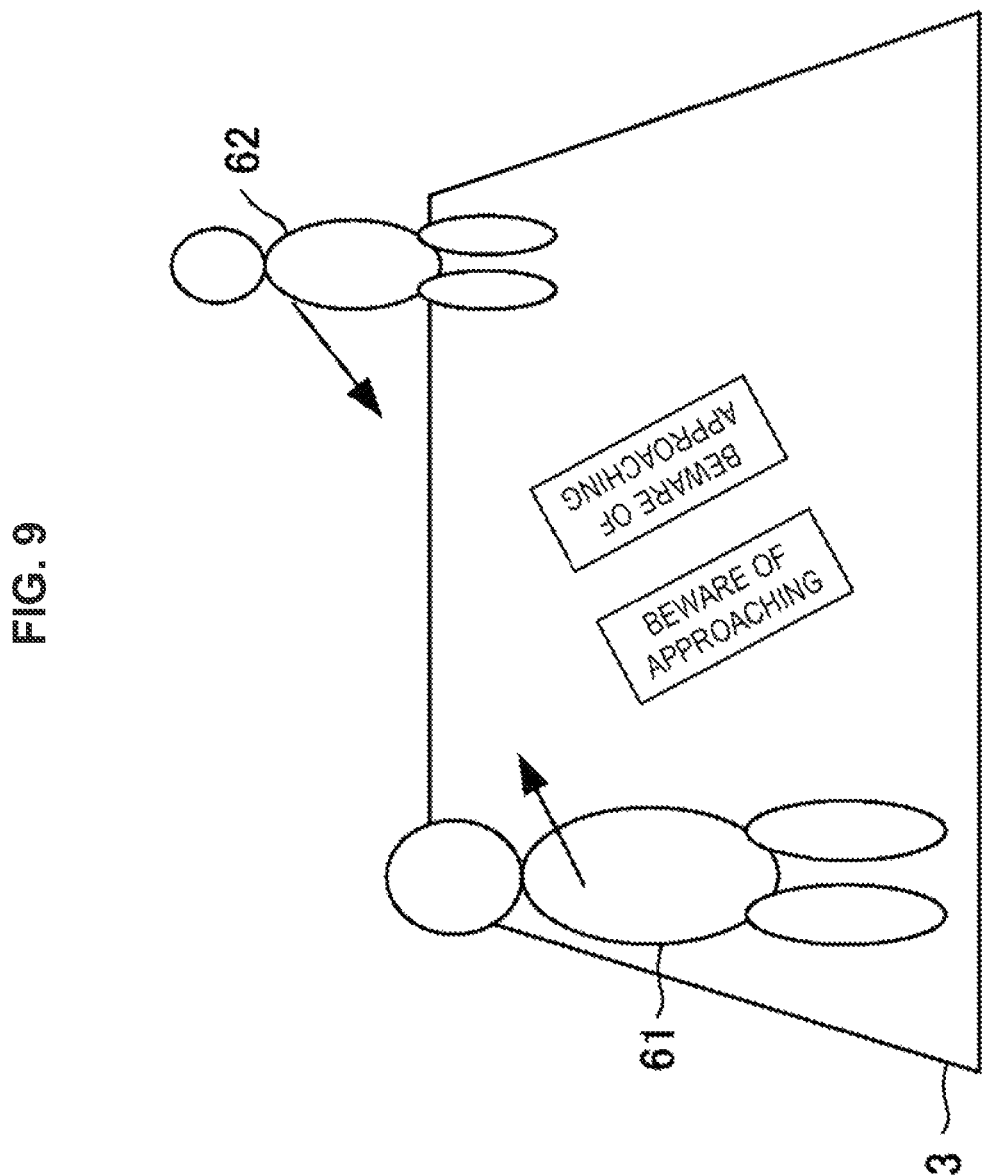

FIGS. 8 and 9 are diagrams illustrating examples of usage for the purpose of ensuring social distancing to alleviate congestion, prevent the spread of disease, and the like.

In FIG. 8, both of the pedestrians 61 and 62 are moving toward the back side relative to the paper surface, and when the distance between pedestrians 61 and 62 reaches a certain distance, the pedestrian 61 is given a sign indicating "Beware of approaching", for example. Note that this sign may follow the walking position of the pedestrian 61 and indicate "Do not exceed this sign", for example.

In FIG. 9, the pedestrian 61 and the pedestrian 62 are traveling facing each other, and when the distance between the pedestrian 61 and the pedestrian 62 reaches a certain distance, signs indicating "Beware of approaching" are respectively displayed in accordance with the traveling directions of the pedestrian 61 and the pedestrian 62. At this time, the sign displayed to the pedestrian 61 and the sign displayed to the pedestrian 62 may be in different display modes, or the sign may be displayed to either the pedestrian 61 or the pedestrian 62.

Note that in the above usage examples, symbols other than text and arrows may be used as display signs, and the same image may be presented to a plurality of pedestrians. Also, for example, a super-directive acoustic element such as a parametric speaker may be used to simultaneously present voice guides respectively corresponding to the pedestrians.

[Program]

A program according to the first example embodiment need only be a program that causes a computer to execute steps S1 to S5 shown in FIG. 5. The computer is constituted by, for example, combining hardware such as a CPU (e.g., a multi-processor equipped with a plurality of processor cores), a GPU (Graphics Processing Units), a DSP (Digital Signal Processors), and an FPGA (Field-Programmable Gate Arrays). The pedestrian guidance device and pedestrian guidance method according to the example embodiment can be realized by this program being installed in the computer and executed. In this case, a processor of the computer performs processing while functioning as the detection unit 2 and the display unit 3.

Also, examples of the computer include a smartphone and a tablet terminal device in addition to a general-purpose PC.

Also, the program of the example embodiment may be executed by a computer system constituted by a plurality of computers. In this case, for example, the computers may each function as one of the detection unit 2 and the detection unit 3.

[Variations]

Figure 10:
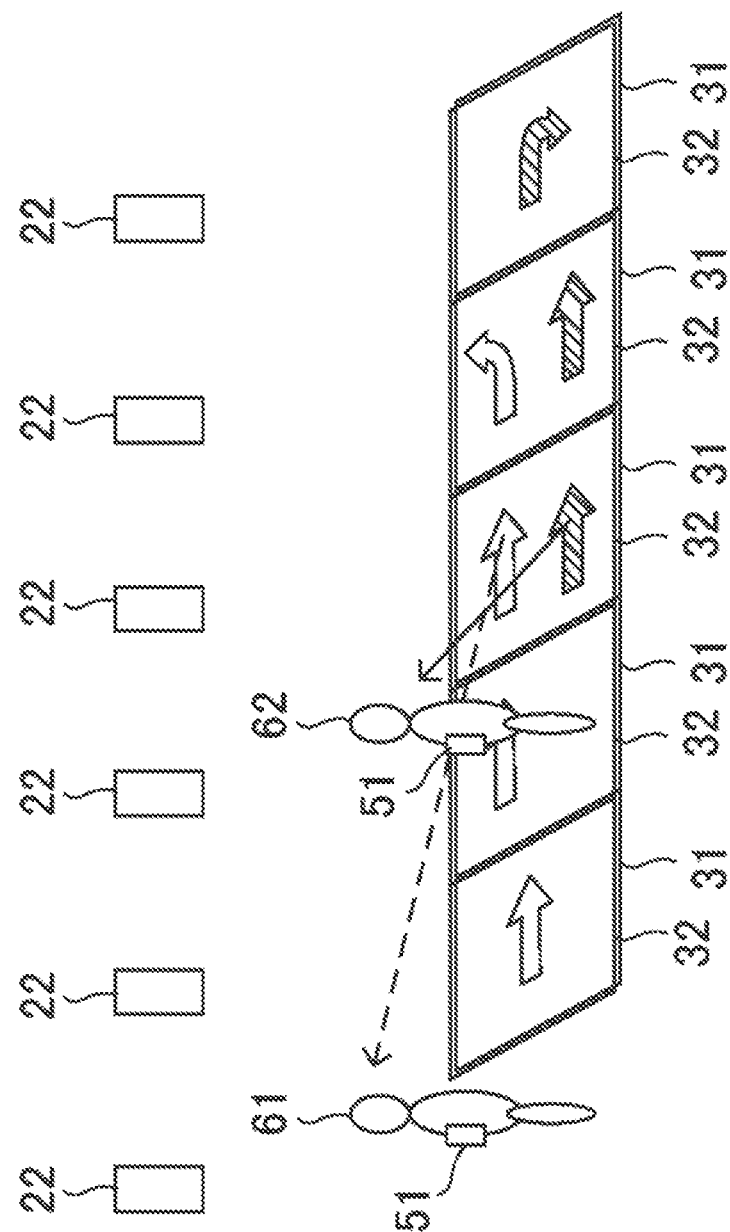
FIG. 10 is a diagram illustrating a case where the viewpoint positions and attributes of the pedestrians are detected from the mobile terminals respectively held by the pedestrians.

FIG. 10 is a diagram illustrating a case where the viewpoint positions and attributes of the pedestrians are detected from the mobile terminals respectively held by the pedestrians. A plurality of wireless relay devices 22 are provided on the path. The wireless relay devices 22 perform data communication with mobile terminals 51 held by the pedestrians. The detection unit 2 detects the position of one of the pedestrians by performing data communication with the mobile terminal 51 via the wireless relay device 22. Next, the detection unit 2 calculates, from the detected position, the viewpoint position of the pedestrian and the direction from the display units 3 to the viewpoint position, respectively. Here, the pedestrian's viewpoint position (eye height) may be detected, for example, based on a height estimated based on the position and attribute (e.g., child or adult, gender) of the pedestrian obtained through data communication. If the pedestrian's height is included in the attribute of the pedestrian, the height may also be used. Further, the direction from each display unit 3 to a viewpoint position of a pedestrian of average height may be set in advance for each position. Also, the detection unit 2 obtains the attribute stored in the mobile terminal 51 from the mobile terminal 51 via the wireless relay device 22. The mobile terminal 51 may be a mobile phone, a wireless tag such as an RFID, or the like.

Further, although the detection unit 2 detects the viewpoint positions from the image-capturing result through the image capturing devices 21, the method for detection is not limited thereto. The detection unit 2 may detect the pedestrians' viewpoint positions based on the detection results of various sensors such as optical distance sensors, optical position sensors, floor surface pressure sensors, and electromagnetic induction sensors. As the optical distance sensors or the optical position sensors, Time-of-Flight (ToF) type sensors or light interruption detection sensors may be installed at multiple heights to obtain the heights and the viewpoint positions of the pedestrians. Alternatively, the directions to a viewpoint position of a pedestrian of average height may be set in advance.

Further, for example, when a plurality of floor surface pressure sensors are used, the directions from the display units 3 to a viewpoint position of a pedestrian of average height are set in advance for each sensor. Then, when one of the sensors detects a pedestrian, the detection unit 2 obtains the directions set in the sensor. Then, the display units 3 display images such that the images are presented in the obtained directions.

Second Example Embodiment

Next, a pedestrian guidance device according to a second example embodiment of the invention will be described with reference to the drawing. In the second example embodiment, the configuration of the display units 3 is different from that of the first example embodiment. Hereinafter, only the difference will be described.

Figure 11:
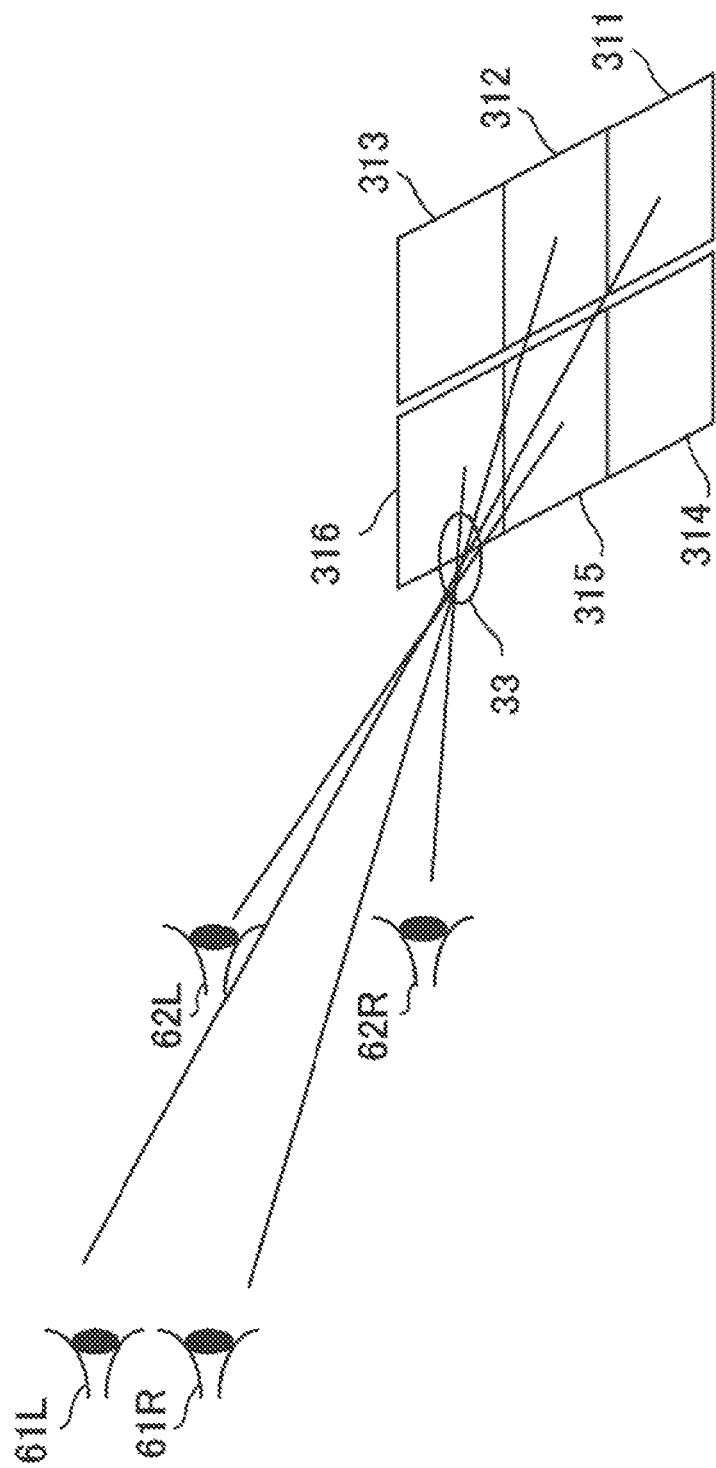
FIG. 11 is a diagram for illustrating the configuration of the display units of the pedestrian guidance device according to the second example embodiment.
Figure 12:
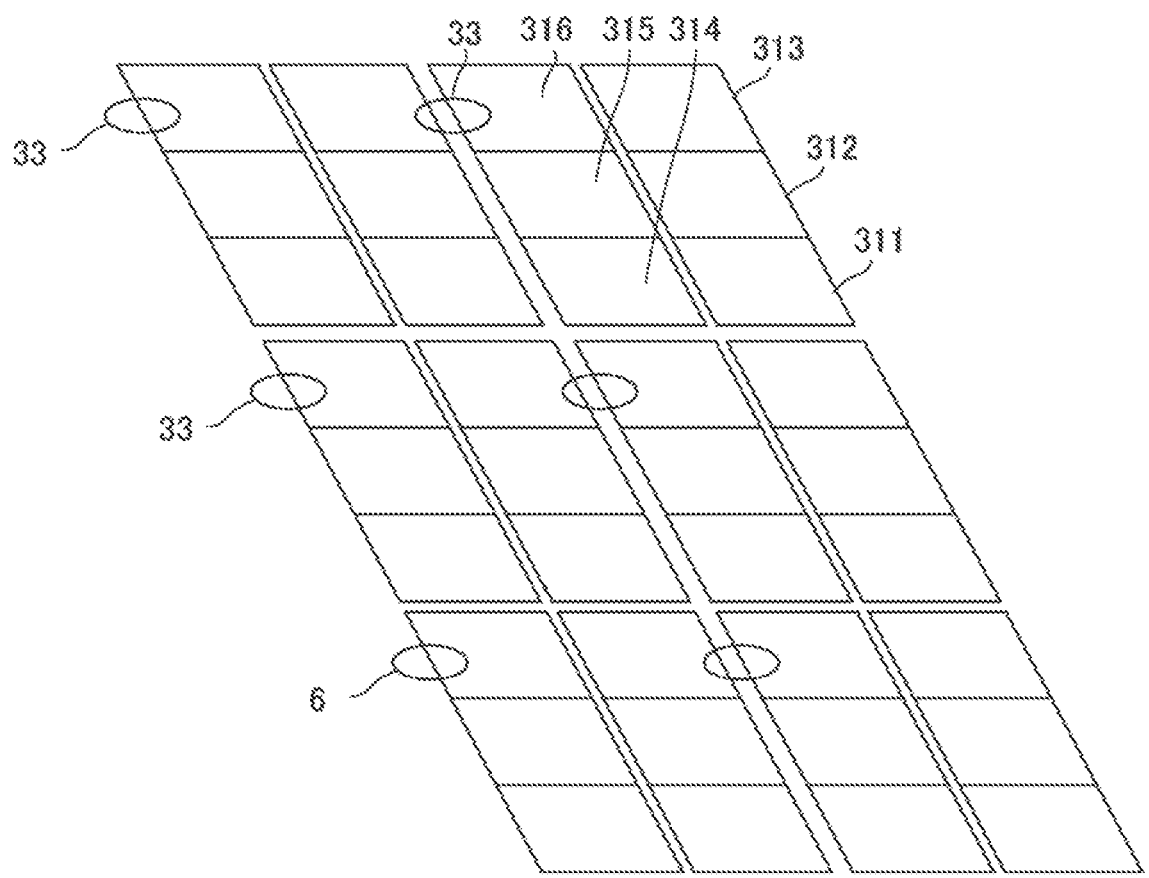
FIG. 12 is a diagram for illustrating the configuration of the display units of the pedestrian guidance device according to the second example embodiment.

FIGS. 11 and 12 are diagrams for illustrating the configuration of the display units 3 of the pedestrian guidance device according to the second example embodiment.

In this example, each display unit 3 is configured such that six pixels 311, 312, 313, 314, 315, and 316 respectively emit light in six different directions. Each display unit 3 is based on an integral photography method in which six pixels 311 to 316 correspond to one pinhole 33. As shown in FIG. 12, on the whole, the display unit 3 is formed by a display element 31 provided with a pinhole array, and each pinhole 33 emits light from the pixels 311 to 316 corresponding to six directions. Note that a lens array may be used instead of a pinhole array.

For example, a right eye 61R of the pedestrian 61 sees only a right-eye image formed by a pixel (pixel 312 in FIG. 11) corresponding to the direction of the viewpoint position, and a left eye 61L sees only a left-eye image formed by a pixel (pixel 311 in FIG. 11) corresponding to the direction of the viewpoint position. A parallax difference is given between the right-eye image and the left-eye image, and thus the pedestrian 61 can three-dimensionally see the image. Similarly, a right eye 62R of the pedestrian 62 sees only a right-eye image formed by a pixel (pixel 316 in FIG. 11) corresponding to the direction of the viewpoint position, and a left eye 62L sees only a left-eye-image formed by a pixel (pixel 315 in FIG. 11) corresponding to the direction of the viewpoint position. A parallax difference is given between the right-eye image and the left-eye image, and thus the pedestrian 62 can three-dimensionally see the image.

Since other configurations and operations are similar to the first example embodiment, the description thereof will be omitted.

According to the second example embodiment as described above, by presenting the information respectively corresponding to the plurality of sight line viewpoint positions and attributes of the plurality of pedestrians to the plurality of pedestrians present in the same area on the display units 3, it is possible to appropriately guide the plurality of pedestrians to their respective destinations without disturbing their walking posture, that is to say, in a natural posture. Also, according to the second example embodiment, due to the image being three-dimensionally displayed, the route to the destination can be presented to the pedestrian in a manner that is easier to understand, in some cases.

[Program]

A program according to the second example embodiment need only be a program that causes a computer to execute steps S1 to S5 shown in FIG. 5. The computer is constituted by, for example, combining hardware such as a CPU (e.g., a multi-processor equipped with a plurality of processor cores), a GPU (Graphics Processing Units), a DSP (Digital Signal Processors), and an FPGA (Field-Programmable Gate Arrays). The pedestrian guidance device and pedestrian guidance method according to the example embodiment can be realized by this program being installed in the computer and executed. In this case, a processor of the computer performs processing while functioning as the detection unit 2 and the display unit 3.

Also, examples of the computer include a smartphone and a tablet terminal device in addition to a general-purpose PC.

Also, the program of the second example embodiment may be executed by a computer system constituted by a plurality of computers. In this case, for example, the computers may each function as one of the detection unit 2 and the detection unit 3.

Third Example Embodiment

Next, a pedestrian guidance device according to a third example embodiment of the present invention will be described with reference to the drawings. In the third example embodiment, the configuration for detecting a pedestrian is different from that of the first example embodiment. Hereinafter, only the difference will be described.

Figure 13:
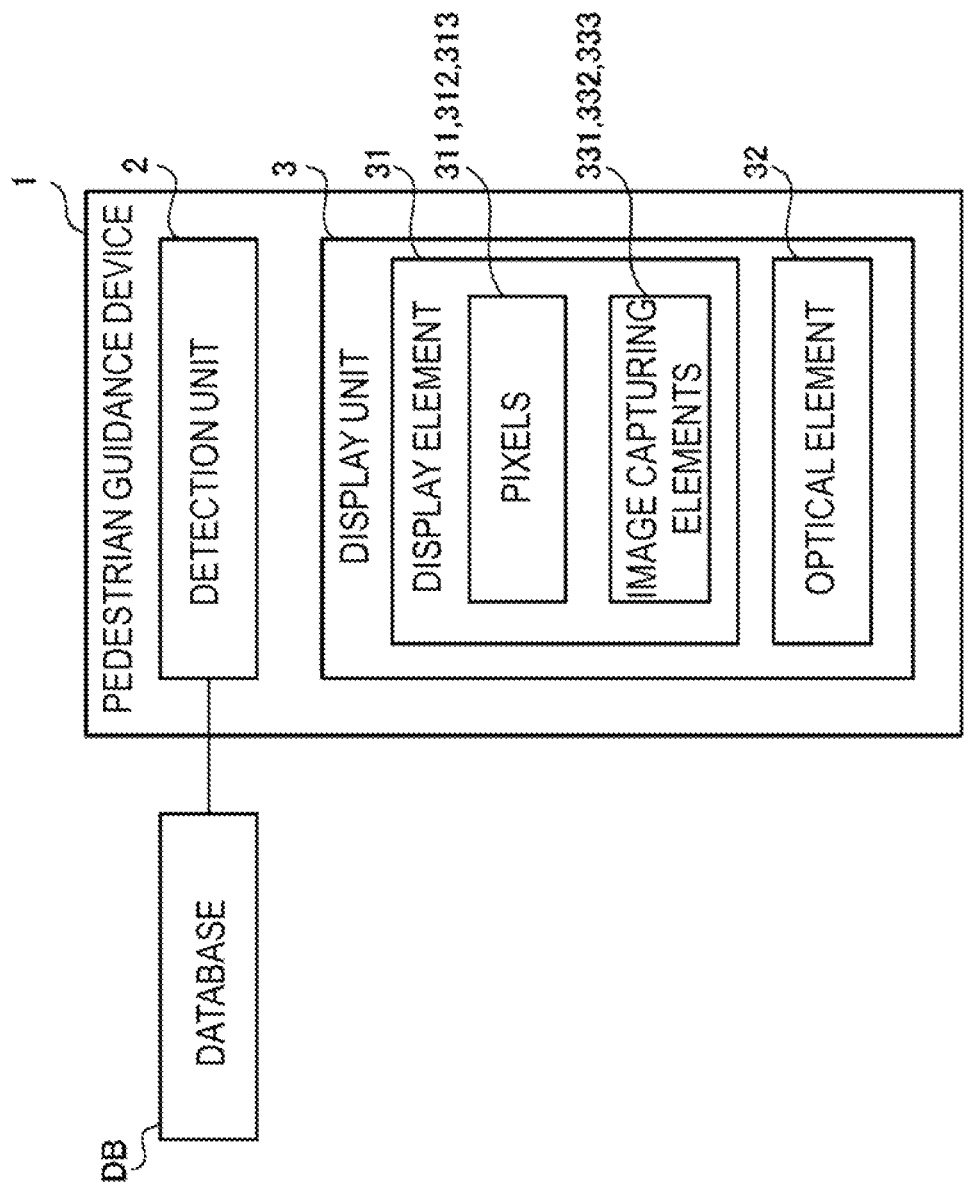
FIG. 13 is a configuration diagram for illustrating the specific configuration of the pedestrian guidance device according to the third example embodiment.
Figure 14:
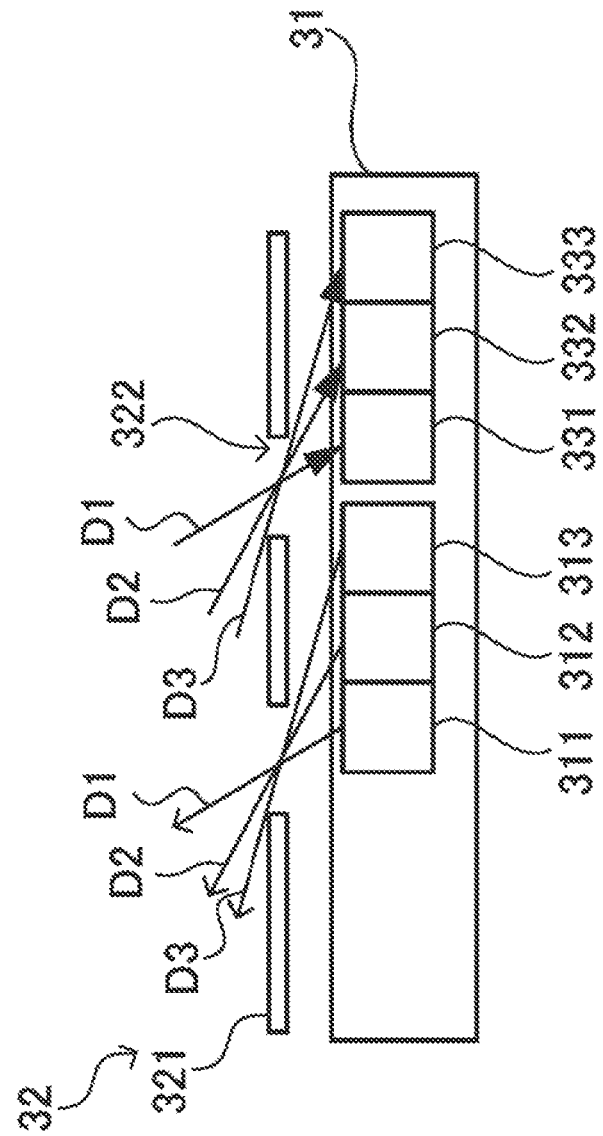
FIG. 14 is a diagram for illustrating the configuration of the display unit of the third example embodiment.

FIG. 13 is a configuration diagram for illustrating the specific configuration of the pedestrian guidance device 1 according to the third example embodiment. FIG. 14 is a diagram for illustrating the configuration of the display unit 3 of the third example embodiment. The display unit 3 of the third example embodiment has a basic configuration in which some pixels of the display unit 3 described in the first example embodiment are replaced with image capturing elements. In other words, the display elements 31 of the third example embodiment include pixels 311, 312, and 313, and image capturing elements 331, 332, and 333.

The image capturing elements 331, 332, and 333 in FIG. 14 detect light from the same directions as directions D1, D2, and D3 in which the pixels 311, 312, and 313 emit light, through a parallax barrier, which serves as an optical element 32. The parallax barrier controls propagation of light emitted from the pixels 311, 312, and 313, and controls propagation of light that enters the image capturing elements 331, 332, and 333. Specifically, only light from the direction D1 enters the image capturing element 331 and the image capturing element 331 detects the light from the direction D1. Only light from the direction D2 enters the image capturing element 332, and the image capturing element 332 detects the light from the direction D2. Only light from the direction D3 enters the image capturing element 333, and the image capturing element 333 detects the light from the direction D3. In this manner, the image capturing elements can capture the images of the pedestrian in the corresponding directions, and by capturing the image of the pedestrian by image capturing elements, the detection unit 2 can detect the pedestrian and his or her viewpoint position. The method for detection is similar to the first example embodiment.

Since other configurations and operations are similar to the first example embodiment, the description thereof will be omitted.

According to the third example embodiment as described above, by presenting the information respectively corresponding to the plurality of viewpoint positions and attributes of the plurality of pedestrians to the plurality of pedestrians present in the same area on the display units 3, it is possible to appropriately guide the plurality of pedestrians to their respective destinations without disturbing their walking posture, that is to say, in a natural posture. Also, according to the third example embodiment, due to the image capturing elements for detecting the pedestrians being provided integrally with the display unit 3, it is no longer necessary to provide a sensor for detecting pedestrians on the path, and thus there are effects that the scenery is not spoiled, the installation work is simplified, and the cost can be reduced.71

Note that a configuration is also possible in which, in the configuration described in the second example embodiment, the pixels corresponding to the left and right eyes of each pedestrian may be caused to emit light so that a three-dimensional image can be observed.

[Program]

A program according to the third example embodiment need only be a program that causes a computer to execute steps S1 to S5 shown in FIG. 5. The computer is constituted by, for example, combining hardware such as a CPU (e.g., a multi-processor equipped with a plurality of processor cores), a GPU (Graphics Processing Units), a DSP (Digital Signal Processors), and an FPGA (Field-Programmable Gate Arrays). The pedestrian guidance device and pedestrian guidance method according to the example embodiment can be realized by this program being installed in the computer and executed. In this case, a processor of the computer performs processing while functioning as the detection unit 2 and the display unit 3.

Also, examples of the computer include a smartphone and a tablet terminal device in addition to a general-purpose PC.

Also, the program of the third example embodiment may be executed by a computer system constituted by a plurality of computers. In this case, for example, the computers may each function as one of the detection unit 2 and the detection unit 3.

Fourth Example Embodiment

Next, a pedestrian guidance device according to a fourth example embodiment of the present invention will be described with reference to the drawings. In the fourth example embodiment, the configuration of the display unit 3 is different from that in the first example embodiment. Hereinafter, only the difference will be described.

Figure 15:
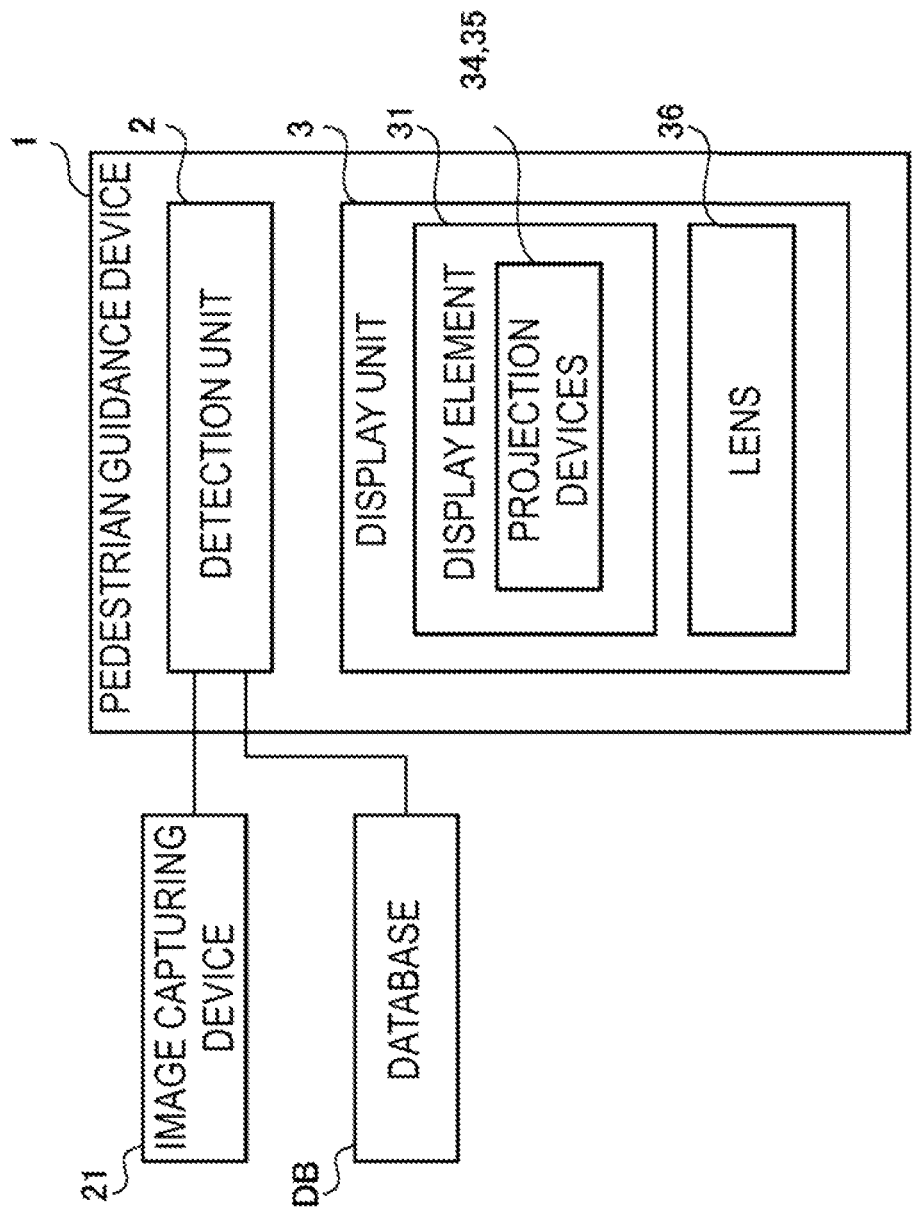
FIG. 15 is a configuration diagram for illustrating a specific configuration of a pedestrian guidance device according to the fourth example embodiment.
Figure 16:
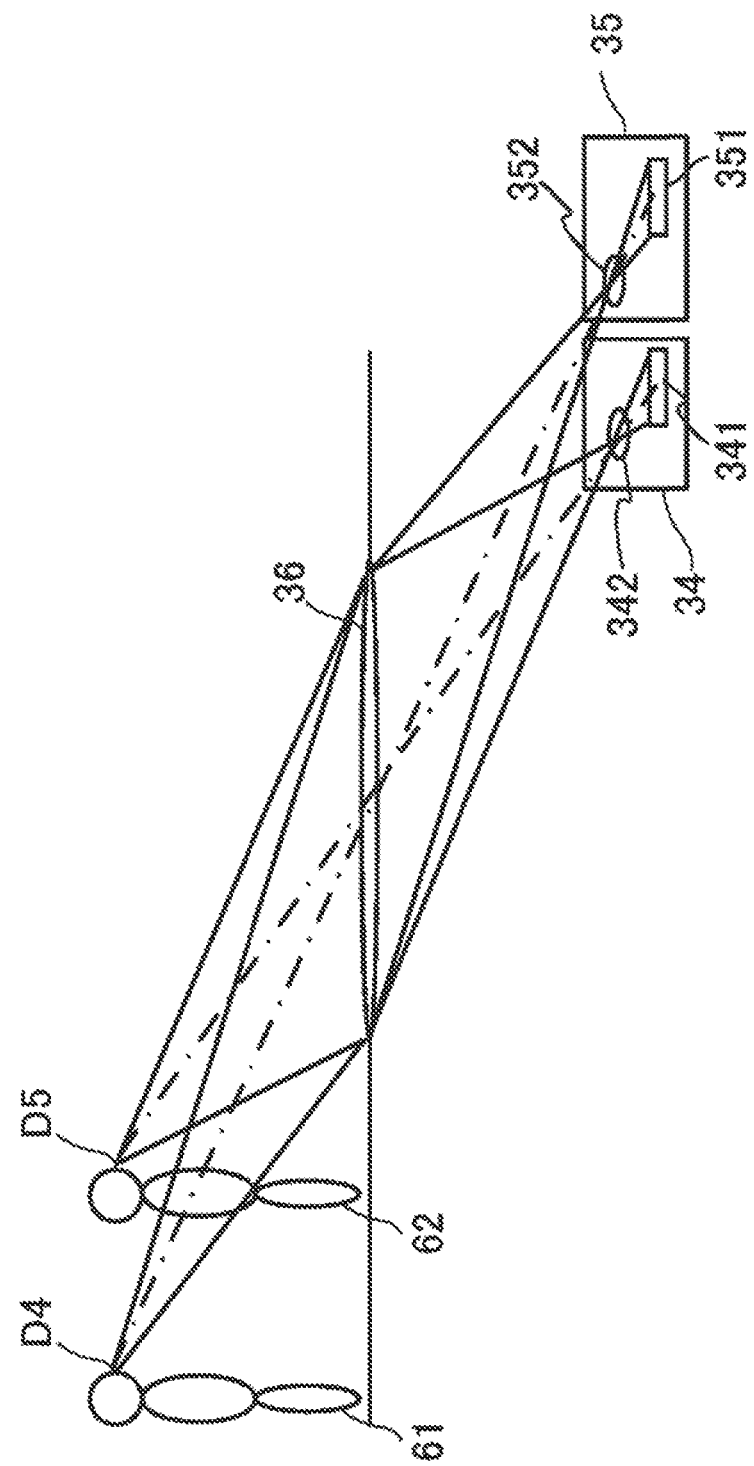
FIG. 16 is a diagram for illustrating the configuration of the display unit of the fourth example embodiment.

FIG. 15 is a configuration diagram for illustrating a specific configuration of a pedestrian guidance device according to the fourth example embodiment. FIG. 16 is a diagram for illustrating the configuration of the display unit 3 of the fourth example embodiment.

The display unit 3 includes a plurality of projection devices 34 and 35, and a lens 36. The lens 36 is provided on the floor surface on which the pedestrians walk. The lens 36 is a Fresnel lens, for example. A transparent acryl plate with a thickness that can support the weight of pedestrians is provided on the side of the Fresnel lens on which the pedestrians walk. Note that various types of optical means having similar image formation functions, such as a concave mirror formed by attaching a plane mirror to a Fresnel lens, or a retroreflection screen, may be used.

The projection devices 34 and 35 are devices for projecting an image to be displayed as an enlarged image on the lens 36 through a projection optical system from different directions. For example, the projection devices 34 and 35 are liquid crystal projectors. The projection devices 34 and 35 form the images displayed by the display elements 341 and 351, on the lens 36.

The lens 36 controls propagation of light emitted from the projection devices 34 and 35. The lens 36 forms images of exit pupils 342 and 352 of the projecting lenses of the projection devices 34 and 35, on the positions D4 and D5 in respectively different directions. For example, if the detected direction of the viewpoint position of the pedestrian 61 is the direction of the position D4, the projection device 35 corresponding to the direction of the position D4 projects an image corresponding to the attribute of the pedestrian 61 on the lens 36. By doing so, the image is presented in the direction of the position D4, that is, the direction of the viewpoint position of the pedestrian 61, through the lens 36. Also, if the detected viewpoint position of the pedestrian 62 is the direction of the position D5, the projection device 34 corresponding to the direction of the position D5 projects an image corresponding to the attribute of the pedestrian 62 on the lens 36. By doing so, the image is presented in the direction of the position D5, that is, the direction of the viewpoint position of the pedestrian 62, through the lens 36. In this manner, the pedestrian 61 can sense only the image displayed by the display element 341 and the pedestrian 62 senses only the image displayed by the display element 351. In this manner, the images respectively corresponding to the pedestrians are independently displayed on the same display surface (lens 36).

Since the other configurations and operations are similar to the first example embodiment, the description thereof is omitted. With the example embodiment, there is an effect that use of the projection devices makes it possible to freely set the display area. Also, since commercial products can be used for the projection device, a Fresnel lens, and the like, there is an effect that a specific display unit is not required to be newly manufactured, and the implementation cost can be reduced.

According to the fourth example embodiment as described above, by presenting the information respectively corresponding to the plurality of sight line-viewpoint positions and attributes of the plurality of pedestrians to the plurality of pedestrians present in the same area on the display units 3, it is possible to appropriately guide the pedestrians to their respective destinations without disturbing their walking posture, that is to say, in a natural posture.

Note that the projection devices 34 and 35 need only be devices that can display images, and may be projectors using DMD elements as display elements, or the like. Also, projection devices corresponding to the left and right eyes of each pedestrian may be installed so that three-dimensional images can be observed. The number of the projection devices are changed as appropriate in accordance with the number of directions in which the images are presented.

[Program]

A program according to the fourth example embodiment need only be a program that causes a computer to execute steps S1 to S5 shown in FIG. 5. The computer is constituted by, for example, combining hardware such as a CPU (e.g., a multi-processor equipped with a plurality of processor cores), a GPU (Graphics Processing Units), a DSP (Digital Signal Processors), and an FPGA (Field-Programmable Gate Arrays). The pedestrian guidance device and pedestrian guidance method according to the example embodiment can be realized by this program being installed in the computer and executed. In this case, a processor of the computer performs processing while functioning as the detection unit 2 and the display unit 3.

Also, examples of the computer include a smartphone and a tablet terminal device in addition to a general-purpose PC.

Also, the program of the fourth example embodiment may be executed by a computer system constituted by a plurality of computers. In this case, for example, the computers may each function as one of the detection unit 2 and the detection unit 3.

Fifth Example Embodiment

Next, a pedestrian guidance device according to a fifth example embodiment of the present invention will be described with reference to the drawings. In the fifth example embodiment, a configuration for detecting pedestrians is combined with the configuration of the display unit 3 of the fourth example embodiment. Hereinafter, only the configuration for detecting the pedestrians will be described and the description of the configuration of the display unit 3 will be omitted.

Figure 17:
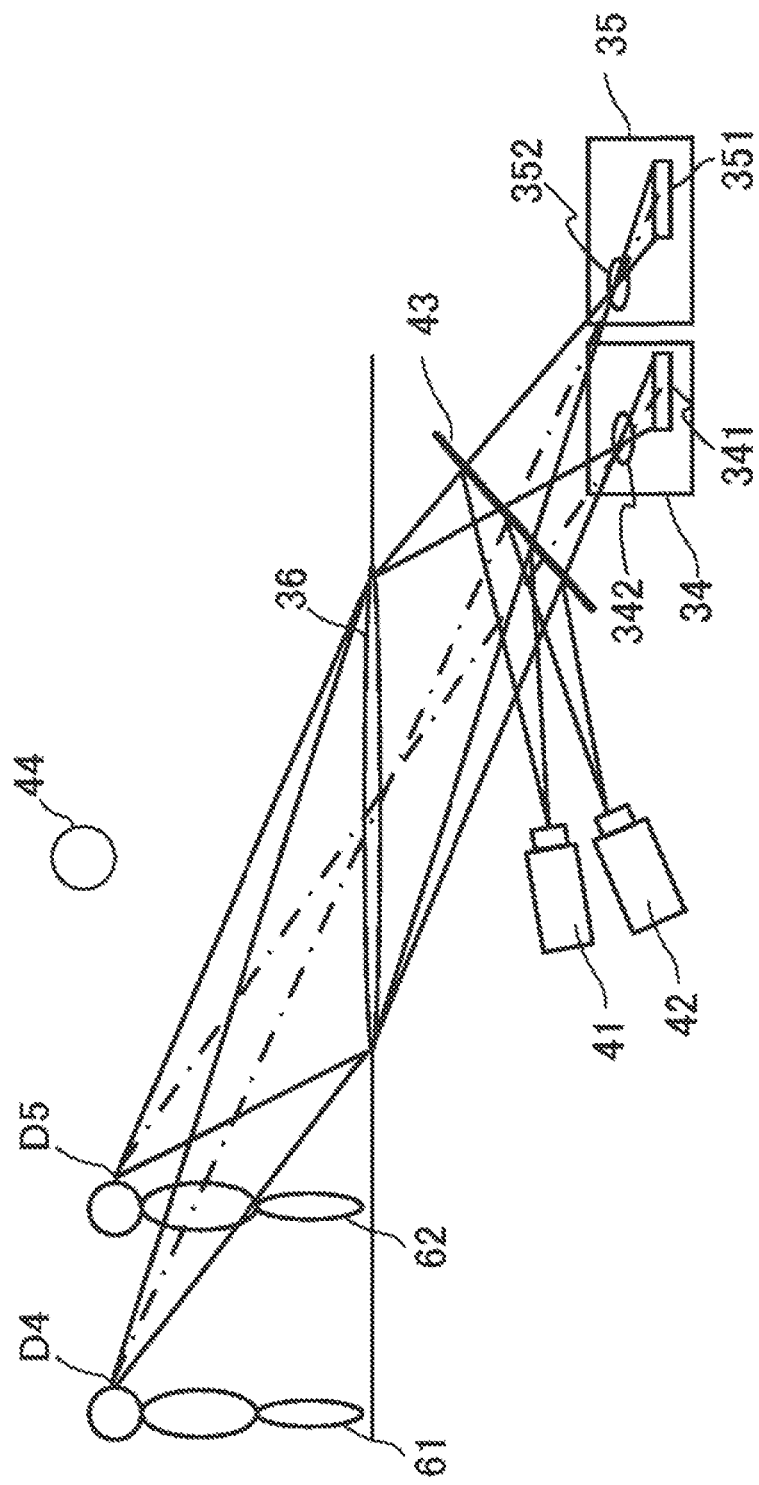
FIG. 17 is a diagram for illustrating a configuration for detecting the pedestrians according to the fifth example embodiment.

FIG. 17 is a diagram for illustrating a configuration for detecting the pedestrians according to the fifth example embodiment.

A dichroic mirror 43 is provided between the projection devices 34 and 35, and the lens 36. The dichroic mirror 43 transmits visible light and reflects near infrared light. Further, image capturing devices 41 and 42 that receive near infrared light reflected from the dichroic mirror 43 are provided. The image capturing devices 41 and 42 are cameras using a semiconductor sensor (e.g., CMOS and CCD) as a light-receiving element, for example. The dichroic mirror 43 is installed such that the near infrared light emitted from the directions of the positions D4 and D5 and transmitted through the lens 36 is reflected on the dichroic mirror 43 and enters the image capturing devices 41 and 42. Then, an optical image-forming condition is set such that the image capturing device 41 can capture the image of the pedestrian 62 located at the position D5 through the lens 36, and the image capturing device 42 can capture the image of the pedestrian 61 located at the position D4 through the lens 36.

When the pedestrians 61 and 62 located at the positions D4 and D5 are illuminated through a illumination light source 44 emitting near infrared light, the light reflected from the pedestrians 61 and 62 is reflected on the dichroic mirror 43 after transmitting through the lens 36, and enter the image capturing devices 41 and 42. In this manner, through the image capturing devices 41 and 42, the images of the pedestrians 61 and 62 can be captured. The detection unit 2 detects the viewpoint positions of the pedestrians and the directions to the viewpoint positions, based on the result of image-capturing. Also, the detection unit 2 detects the attributes of the pedestrians 61 and 62 based on the result of image-capturing. Then, the projection devices 34 and 35 corresponding to the directions in which the pedestrians 61 and 62 are detected, project the image corresponding to the attributes of the pedestrians 61 and 62 on the lens 36. In this manner, similarly to the fourth example embodiment, the pedestrians 61 and 62 can sense the images respectively corresponding to their attributes. Note that the method for detecting the attribute from the image-capturing result is similar to the first example embodiment.

Since other configurations and operations are similar to the first example embodiment, the description thereof will be omitted.

According to the fifth example embodiment as described above, by presenting the information respectively corresponding to the plurality viewpoint positions and attributes of the plurality of pedestrians to the plurality of pedestrians present in the same area on the display units 3, it is possible to appropriately guide the pedestrians to their respective destinations without disturbing their walking posture, that is to say, in a natural posture. Also, according to the fifth example embodiment, the need to provide a sensor for detecting pedestrians on the path is eliminated, and thus, there is an effect that the scenery is not spoiled. Also, if the underfloor devices are assembled as a unit in advance before installation, there is an effect that the installation work is simplified, and the cost can be reduced.

Note that the number of image capturing devices is not particularly limited, and is changed as appropriate in accordance with the number of the directions in which the positions of the pedestrians are detected.

[Program]

A program according to the fifth example embodiment need only be a program that causes a computer to execute steps S1 to S5 shown in FIG. 5. The computer is constituted by, for example, combining hardware such as a CPU (e.g., a multi-processor equipped with a plurality of processor cores), a GPU (Graphics Processing Units), a DSP (Digital Signal Processors), and an FPGA (Field-Programmable Gate Arrays). The pedestrian guidance device and pedestrian guidance method according to the example embodiment can be realized by this program being installed in the computer and executed. In this case, a processor of the computer performs processing while functioning as the detection unit 2 and the display unit 3.

Also, examples of the computer include a smartphone and a tablet terminal device in addition to a general-purpose PC.

Also, the program of the fifth example embodiment may be executed by a computer system constituted by a plurality of computers. In this case, for example, the computers may each function as one of the detection unit 2 and the detection unit 3.

[Physical Configuration]

Figure 18:
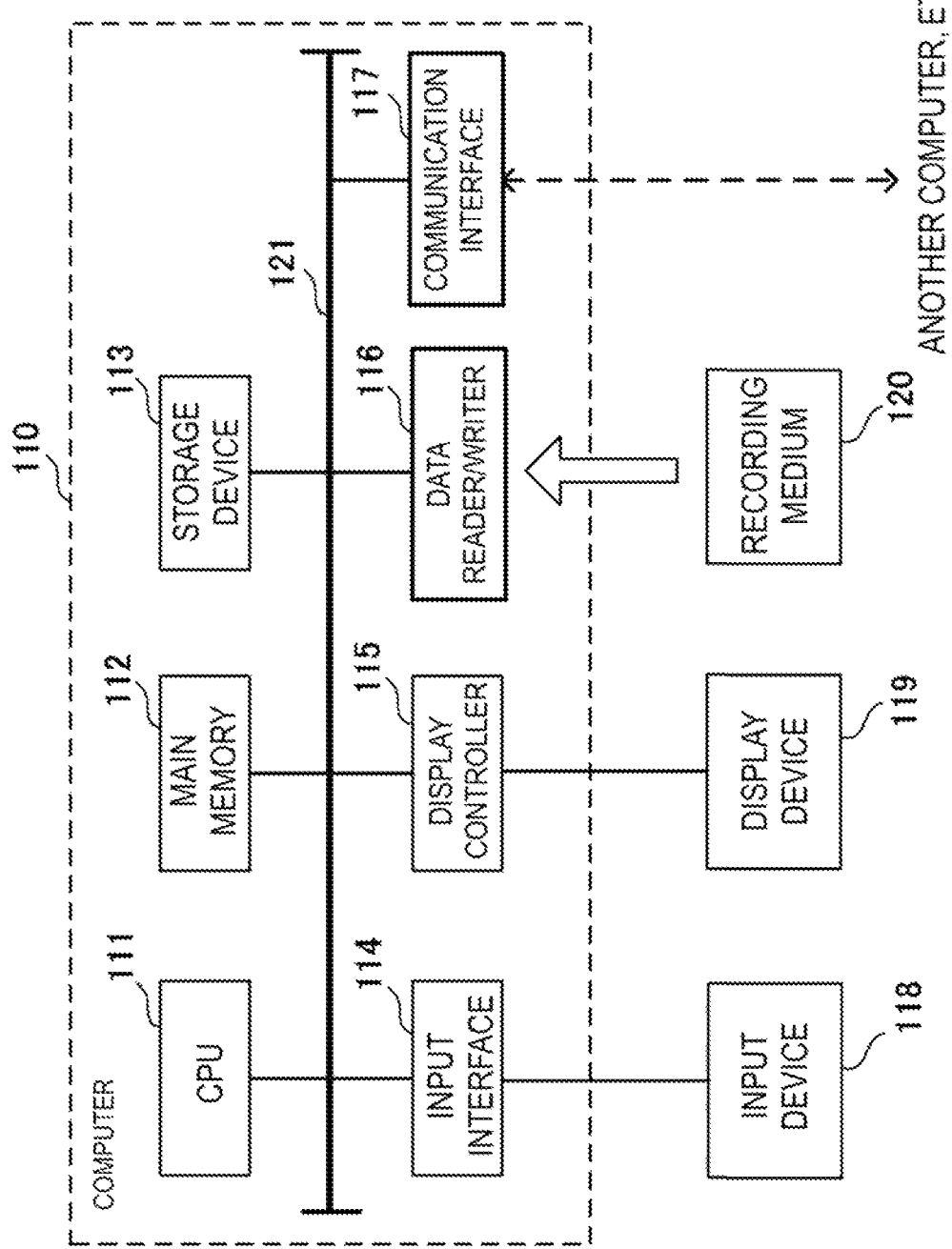
FIG. 18 is a block diagram illustrating one example of a computer that realizes the pedestrian guidance device according to the first to the fifth example embodiment.

Here, a computer that realizes the pedestrian guidance device by executing the program in the example embodiment will be described using FIG. 18. FIG. 18 is a block diagram illustrating one example of a computer that realizes the pedestrian guidance device according to the first to the fifth example embodiment.

As shown in FIG. 18, a computer 110 includes a CPU (Central Processing Unit) 111, a main memory 112, a storage device 113, an input interface 114, a display controller 115, a data reader/writer 116, and a communication interface 117. These units are connected in a manner that enables data communication, via a bus 121.

Also, the computer 110 may include a GPU (Graphics Processing Unit) or an FPGA (Field-Programmable Gate Array), in addition to the CPU 111 or instead of the CPU 111. In this case, the GPU or the FPGA can execute the program according to the present example embodiment.

The CPU 111 carries out various types of computation by deploying the program that constituted by a group of codes according to the present example embodiment stored in the storage device 113 to the main memory 112, and executing the deployed each codes in a predetermined order. The main memory 112 is typically a volatile storage device, such as a DRAM (Dynamic Random Access Memory).

Also, the program according to the present example embodiment is provided in a state where it is stored in a computer readable recording medium 120. Note that the program according to the present example embodiment may also be distributed over the Internet connected via the communication interface 117.

Furthermore, specific examples of the storage device 113 include a hard disk drive, and also a semiconductor storage device, such as a flash memory. The input interface 114 mediates data transmission between the CPU 111 and an input device 118, such as a keyboard and a mouse. The display controller 115 is connected to a display device 119, and controls displays on the display device 119.

The data reader/writer 116 mediates data transmission between the CPU 111 and the recording medium 120, and executes readout of the program from the recording medium 120, as well as writing of the result of processing in the computer 110 to the recording medium 120. The communication interface 117 mediates data transmission between the CPU 111 and another computer.

Also, specific examples of the recording medium 120 include: a general-purpose semiconductor storage device, such as CF (Compact Flash®) and SD (Secure Digital); a magnetic recording medium, such as Flexible Disk; and an optical recording medium, such as CD-ROM (Compact Disk Read Only Memory).

Note that the pedestrian guidance device according to the first to the fifth example embodiment can also be realized by using items of hardware corresponding to respective components, rather than by using the computer with the program installed therein. Furthermore, a part of the pedestrian guidance device may be realized by the program, and the remaining part of the pedestrian guidance device may be realized by hardware.

A part or all of the aforementioned example embodiment can be described as, but is not limited to, the following (Supplementary Note 1) to (Supplementary Note 27).

(Supplementary Note 1)

A pedestrian guidance device comprising:

a detection unit configured to detect respective viewpoint positions and attributes of a plurality of pedestrians; and a display unit configured to display simultaneously a plurality of images for guiding the respective pedestrians on the same screen, based on the respective attributes of the plurality of pedestrians, and displaying the plurality of images such that the plurality of images are displayed in respective directions of the viewpoint positions of the pedestrians respectively corresponding to the images.

(Supplementary Note 2)

The pedestrian guidance device according to Supplementary note 1, wherein the screen on which the images are displayed by the display unit is installed on a floor surface on which the pedestrians walk.

(Supplementary Note 3)

The pedestrian guidance device according to Supplementary note 1 or 2, wherein the detection unit detects positions of the pedestrians through an optical sensor provided on a path on which the pedestrians walk, and detects the viewpoint positions of the pedestrians based on the detected positions, and detects the attributes of the pedestrians based on the result of detection through the optical sensor.

(Supplementary Note 4)

The pedestrian guidance device according to Supplementary note 1 or 2, wherein the detection unit performs data communication with mobile terminal devices respectively held by the pedestrians, detects positions of the pedestrians, and detects the viewpoint positions of the pedestrians based on the detected positions, and detects the attributes of the pedestrians by performing data communication with the mobile terminal devices.

(Supplementary Note 5)

The pedestrian guidance device according to any one of Supplementary notes 1 to 4, wherein the display unit has an optical element that is arranged along a screen for displaying an image and controls propagation of light emitted from the screen.

(Supplementary Note 6)

The pedestrian guidance device according to Supplementary note 5, wherein the optical element is a lenticular lens or a parallax barrier.

(Supplementary Note 7)

The pedestrian guidance device according to Supplementary note 5 or 6, wherein the detection unit detects positions of the pedestrians based on the result of capturing images of the pedestrians through the image capturing element, and detects the viewpoint positions of the pedestrians based on the detected positions, and detects the attributes based on the result, the image capturing element is arranged such that an image capturing surface is flush with a screen on which an image is displayed by the display unit, and the optical element is arranged along the screen on which the image is displayed and the image capturing surface, and controls propagation of light entering the image capturing surface.

(Supplementary Note 8)

The pedestrian guidance device according to any one of Supplementary notes 1 to 4, wherein the display unit includes:

a lens provided on a floor surface on which the pedestrians walk, and a plurality of devices configured to project an image to be displayed, as an enlarged image on the lens through a projecting optical system, from different directions, and the lens controls propagation of light emitted from the plurality of devices.

(Supplementary Note 9)

The pedestrian guidance device according to Supplementary note 8, wherein the detecting unit detects positions of the pedestrians based on results of capturing images of the pedestrians through the lens by the image capturing element, and detects the viewpoint positions of the pedestrians based on the detected positions, and detects the attributes based on the result.

(Supplementary Note 10)

A pedestrian guidance method including:

a step of detecting respective viewpoint positions and attributes of a plurality of pedestrians; and a step of simultaneously displaying a plurality of images for guiding the respective plurality of pedestrians on the same screen, based on the respective attributes of the pedestrians, and displaying the plurality of images such that the plurality of images are presented in respective directions of the viewpoint positions of the pedestrians respectively corresponding to the images.

(Supplementary Note 11)

The pedestrian guidance method according to Supplementary note 10,
wherein in the step of displaying the plurality of images, the images are displayed on a screen installed on a floor surface on which the pedestrians walk.

(Supplementary Note 12)

The pedestrian guidance method according to Supplementary note 10 or 11,
wherein in the step of detecting the viewpoint positions and the attributes,
positions of the pedestrians are detected through an optical sensor provided on a path on which the pedestrians walk, and the viewpoint positions of the pedestrians are detected based on the detected positions of the pedestrians, and
the attributes of the pedestrians are detected based on the result of detection performed by the optical sensor.

(Supplementary Note 13)

The pedestrian guidance method according to Supplementary note 10 or 11,
wherein in the step of detecting the viewpoint positions and the attributes,
data communication is performed with mobile terminal devices respectively held by the pedestrians, the positions of the pedestrians are detected, and the viewpoint positions of the pedestrians are detected based on the detected positions, and
the attributes of the pedestrians are detected by performing data communication with the mobile terminal devices.

(Supplementary Note 14)

The pedestrian guidance method according to any one of Supplementary notes 10 to 13,
wherein an optical element for controlling propagation of light emitted from the screen is arranged along a screen for displaying the images.

(Supplementary Note 15)

The pedestrian guidance method according to Supplementary note 14,
wherein the optical element is a lenticular lens or a parallax barrier.

(Supplementary Note 16)

The pedestrian guidance method according to Supplementary note 14 or 15,
wherein, in the step of detecting the viewpoint positions and the attributes,
positions of the pedestrians are detected based on the result of capturing images of the pedestrians performed by an image capturing element, and the viewpoint positions of the pedestrians are detected based on the detected positions,
the attributes are detected based on the result, and
the image capturing elements are arranged such that an image capturing surface is flush with the screen on which the images are displayed, and the optical element is arranged along the screen for displaying the images and the image capturing surface, and controls propagation of light entering the image capturing surface.

(Supplementary Note 17)

The pedestrian guidance method according to any one of Supplementary notes 10 to 13,
wherein in the step of displaying the plurality of images, the images to be displayed are projected as enlarged images from different directions by a projecting optical system, on a lens installed on a floor surface on which the pedestrians walk, and
the lens controls propagation of light emitted at a time of projecting.

(Supplementary Note 18)

The pedestrian guidance method according to Supplementary note 17,
wherein in the step of detecting the viewpoint positions and the attributes,
positions of the pedestrians are detected based on the result of capturing images of the pedestrians through the lens by the image capturing element, and the viewpoint positions of the pedestrians are detected based on the detected positions, and
the attributes are detected based on the result.

(Supplementary Note 19)

A computer-readable recording medium that includes a program recorded thereon, the program including instructions that cause a computer to carry out:
a step of detecting viewpoint positions and attributes of a plurality of pedestrians; and
a step of simultaneously displaying a plurality of images for guiding the respective pedestrians on the same screen, based on the respective attributes of the plurality of pedestrians, and displaying the plurality of images such that the plurality of images are presented in directions of the viewpoint positions of the pedestrians respectively corresponding to the images.

(Supplementary Note 20)

The computer-readable recording medium according to Supplementary note 19,
wherein in the step of displaying the plurality of images, the images are displayed on a screen installed on a floor surface on which the pedestrians walk.

(Supplementary Note 21)

The computer-readable recording medium according to Supplementary note 19 or 20,
wherein in the step of detecting the viewpoint positions and the attributes,
positions of the pedestrians are detected through an optical sensor provided on a path on which the pedestrians walk, and the viewpoint positions of the pedestrians are detected based on the detected positions of the pedestrians, and
the attributes of the pedestrians are detected based on the result of detection performed by the optical sensor.

(Supplementary Note 22)

The computer-readable recording medium according to Supplementary note 19 or 20,
wherein in the step of detecting the viewpoint positions and the attributes,
data communication is performed with mobile terminal devices respectively held by the pedestrians, the positions of the pedestrians are detected, and the viewpoint positions of the pedestrians are detected based on the detected positions, and
the attributes of the pedestrians are detected by performing data communication with the mobile terminal devices.

(Supplementary Note 23)

The computer-readable recording medium according to any one of Supplementary notes 19 to 22,
wherein an optical element for controlling propagation of light emitted from the screen is arranged along a screen for displaying the images.

(Supplementary Note 24)

The computer-readable recording medium according to Supplementary note 23, wherein the optical element is a lenticular lens or a parallax barrier.

(Supplementary Note 25)

The computer-readable recording medium according to Supplementary note 23 or 24, wherein, in the step of detecting the viewpoint positions and the attributes, positions of the pedestrians are detected based on the result of capturing images of the pedestrians performed by an image capturing element, and the viewpoint positions of the pedestrians are detected based on the detected positions, the attributes are detected based on the result, and the image capturing elements are arranged such that an image capturing surface is flush with the screen on which the images are displayed, and the optical element is arranged along the screen for displaying the images and the image capturing surface, and controls propagation of light entering the image capturing surface.

(Supplementary Note 26)

The computer-readable recording medium according to any one of Supplementary notes 19 to 22, wherein in the step of displaying the plurality of images, the images to be displayed are projected as enlarged images from different directions by a projecting optical system, on a lens installed on a floor surface on which the pedestrians walk, and the lens controls propagation of light emitted at a time of projecting.

(Supplementary Note 27)

The computer-readable recording medium according to Supplementary note 26, wherein in the step of detecting the viewpoint positions and the attributes, positions of the pedestrians are detected based on the result of capturing images of the pedestrians through the lens by the image capturing element, and the viewpoint positions of the pedestrians are detected based on the detected positions, and the attributes are detected based on the result.

Although the invention of the present application has been described above with reference to an example embodiment, the invention is not limited to the example embodiment described above. Various modifications apparent to those skilled in the art can be made to the configurations and details of the invention within the scope of the invention.

INDUSTRIAL APPLICABILITY

As described above, according to the present invention, pedestrians can be appropriately guided to their respective destinations in accordance with positions and attributes of the pedestrians, in a complex facility. The present invention is useful in facilities in which guidance is required, such as medical institutions such as hospitals, transport facilities such as airports, and situations in which social distancing needs to be ensured for the purpose of congestion mitigation or prevention of the spread of disease.

LIST OF REFERENCE SIGNS

1 Pedestrian guidance device
2 Detection unit
3 Display unit
4 Determination unit
21 Image capturing device
31 Display element
32 Optical element
34, 35 Projection device
36 Lens
41, 42 Image capturing device
43 Dichroic mirror
61, 62 Pedestrian
100 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A pedestrian guidance device comprising:
a display device having a screen, and an optical element arranged along the screen;
a plurality of image capturing sensors that each have an image capturing surface flush with the screen of the display device and arranged adjacent to the optical element along the screen, the optical element controlling propagation of light emitted from the screen and entering the image capturing surface of each image capturing sensor such that the light is incident from a different direction for each image capturing sensor;
a processor; and
a memory storing instructions executable by the processor to;
acquire a plurality of first images of a plurality of pedestrians using the image capturing sensor;
detect respective positions of the pedestrians within the first images;
detect respective viewpoint positions of the pedestrians based on the detected respective positions;
detect respective attributes of the pedestrians based on the detected respective viewpoint positions; and
cause the display device to simultaneously display, on the screen, a plurality of second images respectively correspondingly to the plurality of pedestrians, wherein each second image is to guide a corresponding pedestrians, is based on the respective attribute of the corresponding pedestrian, and is displayed in a direction of the respective viewpoint position of the corresponding pedestrian.

2. The pedestrian guidance device according to claim 1, wherein the screen is installed on a floor surface on which the pedestrians walk.

3. The pedestrian guidance device according to claim 1, wherein
the optical element is a lens provided on a floor surface on which the pedestrians walk, and
the screen comprises a plurality of projectors configured to project an enlarged image on the lens from different directions.

4. A pedestrian guidance method performed by a computer and comprising:
acquiring a plurality of first images of a plurality of pedestrians using a plurality of image capturing sensors that each have an image capturing surface flush with a screen of a display device, the display device having an optical element arranged adjacent to the image capturing surface of each image capturing sensor along the screen, the optical element controlling propagation of light emitted from the screen and entering the image capturing surface of each image capturing sensor such that the light is incident from a different direction for each image capturing sensor;

detecting respective positions of the pedestrians within the first images;

detecting respective viewpoint positions of the pedestrians based on the detected respective positions;

detecting respective attributes of the pedestrians based on the detected respective viewpoint positions; and causing the display device to simultaneously display, on the screen, a plurality of second images respectively correspondingly to the plurality of pedestrians, wherein each second image is to guide a corresponding pedestrian, is based on the respective attribute of the corresponding pedestrian, and is displayed in a direction of the respective viewpoint position of the corresponding pedestrian.

5. A non-transitory computer-readable recording medium storing a program executable by a computer to perform:

acquiring a plurality of first images of a plurality of pedestrians using a plurality of image capturing sensors that each have an image capturing surface flush with a screen of a display device, the display device having an optical element arranged adjacent to the image capturing surface of each image capturing sensor along the screen, the optical element controlling propagation of light emitted from the screen and entering the image capturing surface of each image capturing sensor such that the light is incident from a different direction for each image capturing sensor;

detecting respective positions of the pedestrians within the first images;

detecting respective viewpoint positions of the pedestrians based on the detected respective positions;

detecting respective attributes of the pedestrians based on the detected respective viewpoint positions; and causing the display device to simultaneously display, on the screen, a plurality of second images respectively correspondingly to the plurality of pedestrians, wherein each second image is to guide a corresponding pedestrian, is based on the respective attribute of the corresponding pedestrian, and is displayed in a direction of the respective viewpoint position of the corresponding pedestrian.

* * * * *